US006696185B1

(12) United States Patent
Okamoto

(10) Patent No.: US 6,696,185 B1
(45) Date of Patent: Feb. 24, 2004

(54) FUEL CELL AND FASTENING METHOD THEREFOR

(75) Inventor: Takafumi Okamoto, Koshigaya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/981,327

(22) Filed: Dec. 24, 1997

Related U.S. Application Data

(63) Continuation of application No. PCT/JP96/01852, filed on Jul. 4, 1996, now abandoned.

(30) Foreign Application Priority Data

Jul. 7, 1995 (JP) ............................................ 7-172579

(51) Int. Cl.[7] ................................................ H01M 8/00
(52) U.S. Cl. .............................. 429/12; 429/12; 429/30
(58) Field of Search .............................. 429/12, 30, 34, 429/38, 35, 36, 37

(56) References Cited

U.S. PATENT DOCUMENTS 4,169,917 A * 10/1979 Baker et al. .................. 429/26
4,185,145 A * 1/1980 Breault ........................ 429/34
4,781,727 A * 11/1988 Mitsuda et al. ............ 29/623.2
6,080,503 A * 6/2000 Schmid et al. ................ 429/35

FOREIGN PATENT DOCUMENTS

DE 26 43 946 A1 3/1978
DE 2643946 A * 3/1978 ............ H01M/8/24
DE 43 36 850 A1 4/1995
DE 4336850 A * 5/1995 ............ H01M/8/24
EP 0 329 161 A1 8/1989
EP 0329161 A * 8/1989 ............ H01M/8/24
JP 60-37675 2/1985
JP A 61248368 * 3/1987 ............ H01M/8/24
JP 62-217571 9/1987
JP A 62218571 * 3/1988 ............ H01M/8/24
JP 63-149491 6/1988
JP 4-102711 4/1992
JP 6-20713 1/1994
JP 6-68898 3/1994
JP 6-349516 12/1994
JP WO009703477 A1 * 1/1997 ............ H01M/8/24

OTHER PUBLICATIONS

English translation of pertinent portion and English summary of JP 6–68898.
English summary of JP 6–349516.
English summary of JP 60–37675.
English summary of JP 4–102711.
English translation of pertinent portion of JP 63–149491.
Abstract of JP 6–20713 (English translation).
Communication dated Jul. 27, 2000.
Supplementary EP Search Report dated Jul. 20, 2000.
English language Abstract of JP 62–217571.
English language Abstract of DE 43 36 850 A1.
English language Abstract of DE 26 43 946 A1.

* cited by examiner

*Primary Examiner*—Patrick Ryan
*Assistant Examiner*—M. Wills
(74) *Attorney, Agent, or Firm*—Lahive & Cockfield, LLP

(57) ABSTRACT

The present invention provides a fuel cell having a simple structure which is suitable for miniaturization, and which makes it possible to reduce ion conductive resistance of a solid polymer oxide itself and ion conductive resistance and contact resistance between the solid polymer oxide and electrode plates, and a fastening method therefor.

46 Claims, 22 Drawing Sheets

10
12
62b
60
14
18
18c
50
18b
36
16
20
22
40
42
25
62a
20
24
34
18a
22
20
44
52
18d 10
12
14
16
18
18a
18b
18c
18d
20
22
24
25
34
36
40
42
44
50
52
60
62a
62b 18
42
18c
50
18b
36
28
34
44
18d
18a
52

F I G. 4
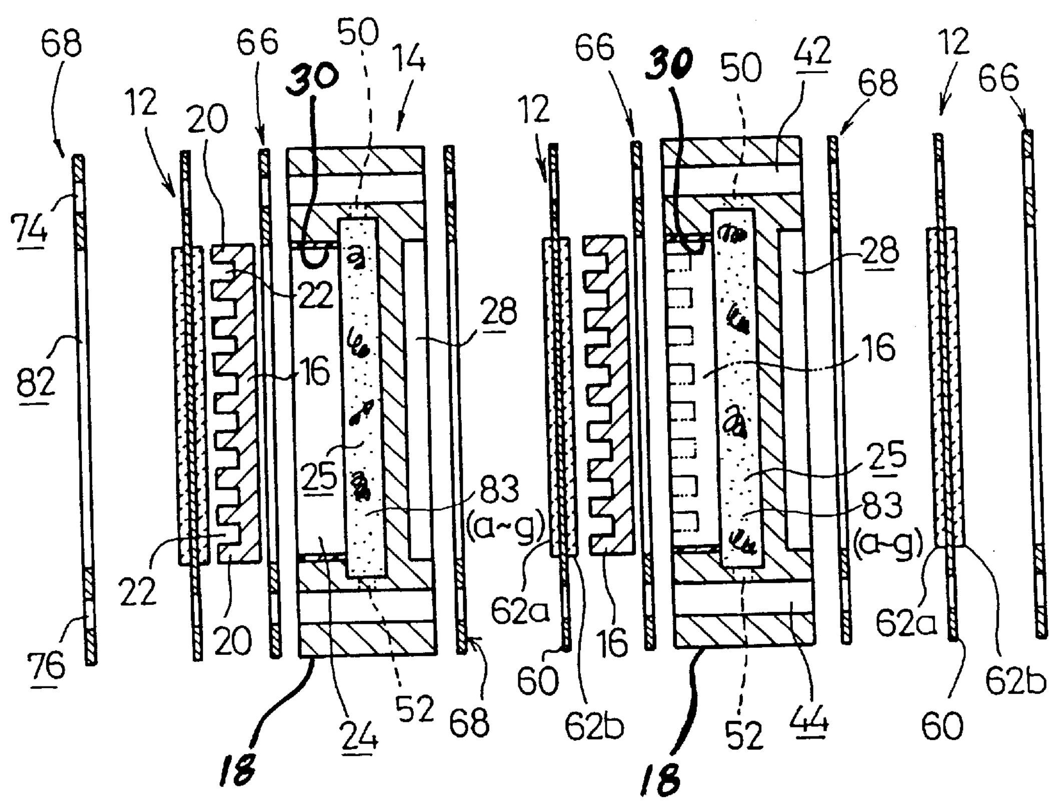

94
18
112a
10
92
96a
96a
96b
112b
84
79
O2
H2
96b
112c
96c
96c
WATER
88
96c (a)
(b)
152
150b
150a
150a
150b
22
154
16
152
20
20
150
154
156
83

150b
68
150a
66
68
62a
62b
66
68
150b
66
92
94
83
83
157a
157b
66
12
152
150a
83
12
150b
150a
12
152

150a
156
62a
150b
92
94
83
157a
157b
16
152
62b
83

CURRENT DENSITY
0
PERIOD UPON COMPLETION OF FUEL CELL
ROOM TEMPERATURE
RESTORE TO ROOM TEMPERATURE
PERIOD DURING ASSEMBLY OF FUEL CELL UNITS
TEMPERATURE OF CONSTITUTIVE ELEMENTS OF FUEL CELL UNITS
TEMPERATURE
BOILING POINT OF FILLER
FASTENING PRESSURE
0

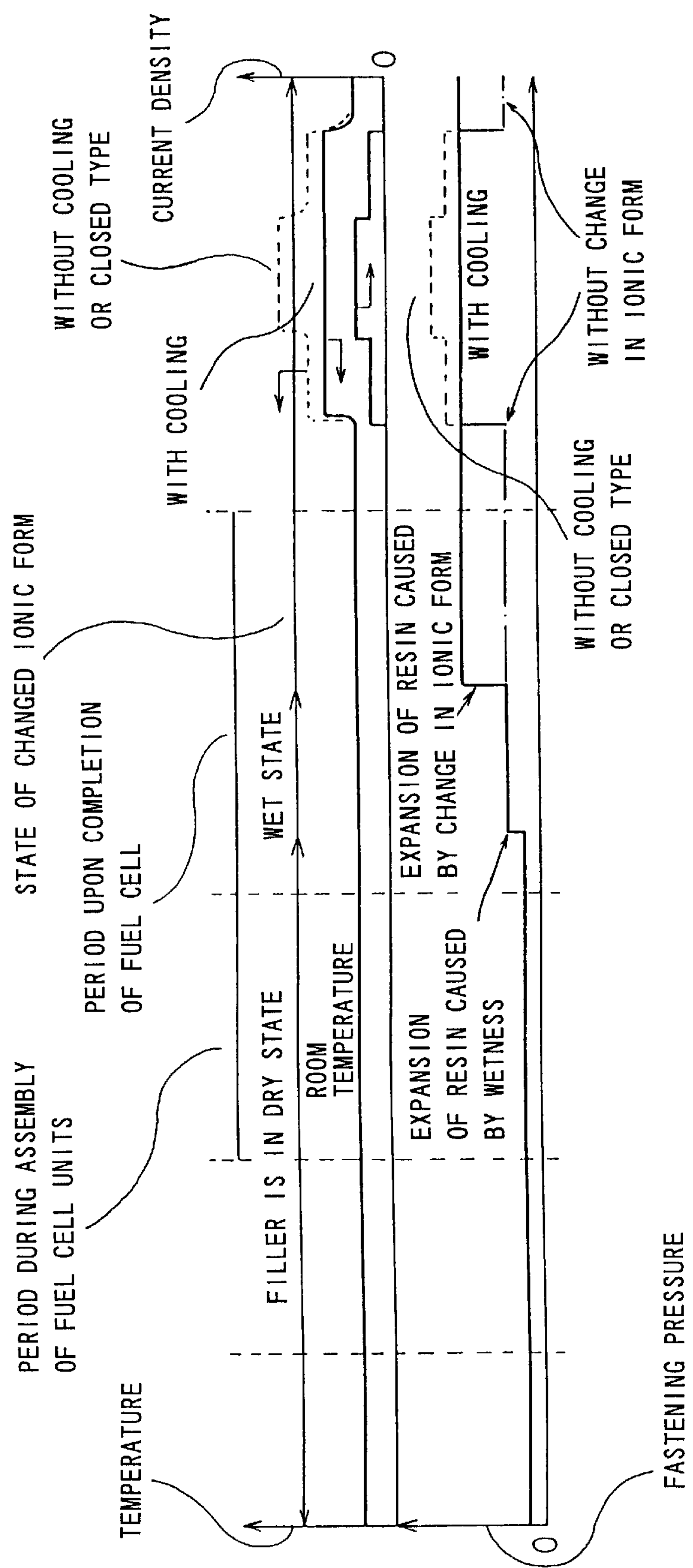
F I G. 19
TEMPERATURE
PERIOD DURING ASSEMBLY OF FUEL CELL UNITS
PERIOD UPON COMPLETION OF FUEL CELL
STATE OF CHANGED IONIC FORM
WITH COOLING
WITHOUT COOLING OR CLOSED TYPE
CURRENT DENSITY
0
FILLER IS IN DRY STATE
WET STATE
ROOM TEMPERATURE
EXPANSION OF RESIN CAUSED BY WETNESS
EXPANSION OF RESIN CAUSED BY CHANGE IN IONIC FORM
WITHOUT COOLING OR CLOSED TYPE
WITH COOLING
WITHOUT CHANGE IN IONIC FORM
FASTENING PRESSURE
0

PERIOD DURING ASSEMBLY OF FUEL CELL UNITS
PERIOD UPON COMPLETION OF FUEL CELL
INCREASE IN TEMPERATURE UPON START-UP OF FUEL CELL
CURRENT DENSITY
START OF THERMAL DECOMPOSITION
TEMPERATURE
TEMPERATURE TO START THERMAL DECOMPOSITION OF FILLER SUBSTANCE
TEMPERATURE OF CONSTITUTIVE ELEMENTS OF SEPARATOR (ROOM TEMPERATURE)
FASTENING PRESSURE
O
O

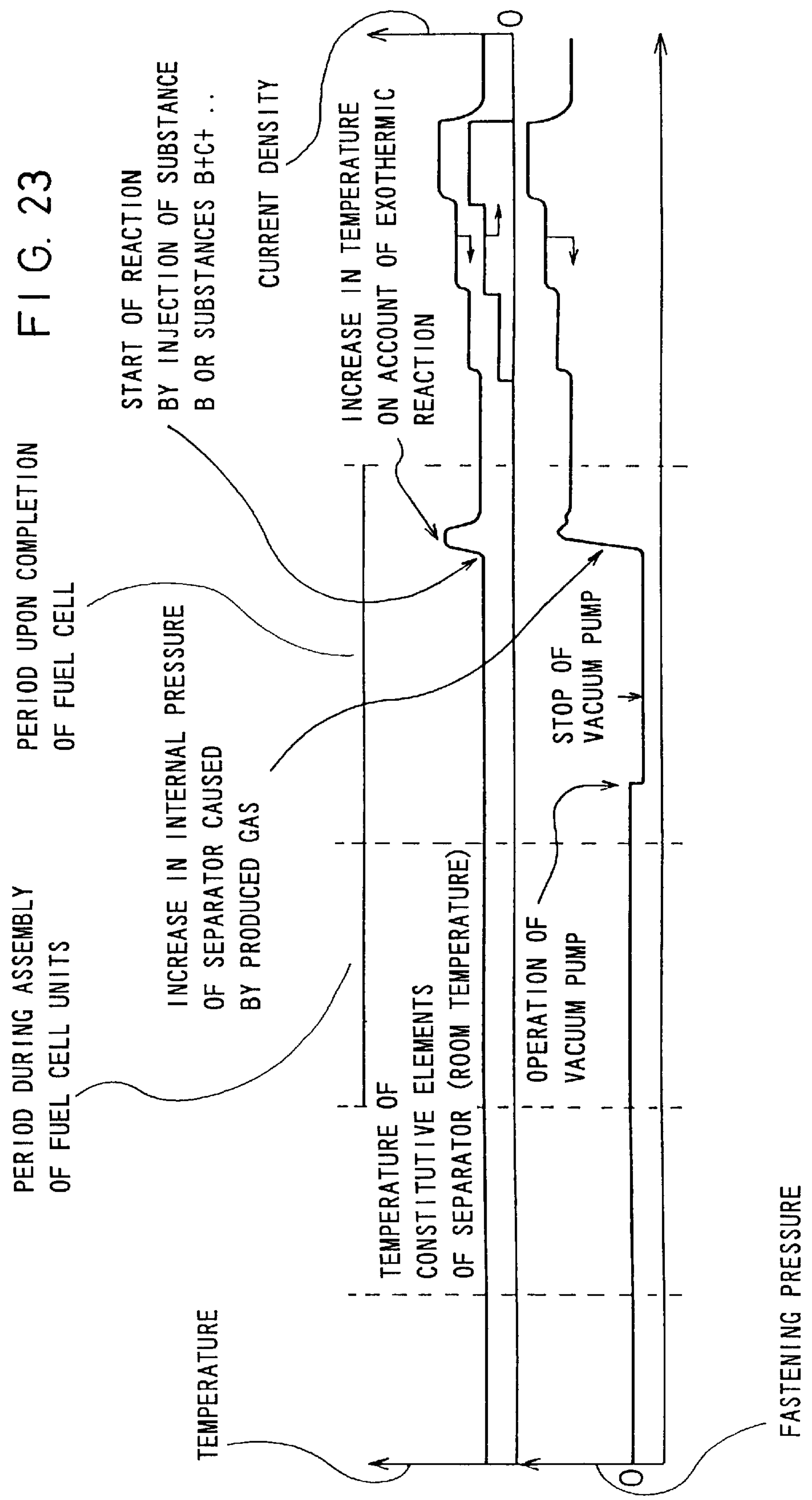
F I G. 23

FUEL CELL AND FASTENING METHOD THEREFOR

RELATED APPLICATIONS

This is a continuation of International application PCT/JP96/01852, with an International filing date of Jul. 4, 1996, published in Japanese under PCT Article 21 (2) and now abandoned.

TECHNICAL FIELD

The present invention relates to a fuel cell and a fastening method therefor. In particular, the present invention relates to a fuel cell in which a fastening pressure-generating means is provided in a fastening pressure-generating plate or a separator for arranging unit fuel cells in a separated manner respectively so that the fastening force on the unit fuel cells is increased or decreased under the action of the fastening pressure-generating means, caused by change in external environment, thermal change, or chemical reaction, and a fastening method therefor.

BACKGROUND ART

For example, the solid polymer oxide type fuel cell includes a plurality of unit fuel cells each of which comprises an electrolyte membrane composed of a polymer oxide, and an anode electrode plate and a cathode electrode plate disposed on both sides of the oxide, the plurality of unit fuel cells constructed as described above being stacked with each other. In such an arrangement, separators are allowed to intervene between the unit fuel cells stacked as described above, and water is supplied to the separators in order that the oxide, the anode electrode plate, and the cathode electrode plate are appropriately humidified. Therefore, when the water is supplied from the separator, the fuel gas such as hydrogen gas supplied to the anode side is ionized into hydrogen ion on the anode electrode plate. The hydrogen ion is moved via the appropriately humidified oxide to the cathode electrode plate composed of porous carbon. Oxygen-containing gas or oxidizing gas such as oxygen gas is supplied to the cathode electrode plate. Accordingly, the hydrogen ion reacts with oxygen on the cathode electrode plate to produce water. On the other hand, electrons are generated during this process, and they are taken out by an external circuit to be utilized as electric energy. Japanese Laid-Open Patent Publication No. 6-20713 discloses a fuel cell of this type.

In the fuel cell constructed as described above, the plurality of fuel cell units are tightly clamped by means of stud bolts penetrating through the respective cell units. Such a structure is adopted in order to prevent the fuel cell-operating gases including the fuel gas such as hydrogen gas and the oxygen-containing gas such as oxygen gas from leakage to the outside, and obtain a desired voltage from the fuel cell units in a stable manner without causing any change in output taken out of each of the fuel cell units, which would be otherwise caused by distribution in contact resistance concerning ionic conductivity and electronic conductivity effected between the electrode plate and the solid polymer oxide and between the electrode plate and the separator.

However, even when the fuel cell is surely clamped by means of the stud bolts as described above, it is feared that the tight clamping state for the respective fuel cell units may be loosened due to, for example, secular change and vibrations which is received when such a fuel cell is used, for example, as a driving power source for electric vehicles. When the clamping state is loosened as described above, for example, distribution occurs in mutual contact resistance and ionic conductivity resistance between the plurality of fuel cell units. As a result, it is difficult to obtain a uniform output from the individual fuel cell units. Consequently, it is impossible to ensure the output stability for such a fuel cell.

DISCLOSURE OF THE INVENTION

The present invention has been made in order to overcome the foregoing inconveniences, an object of which is to provide a fuel cell in which the difference in output is minute between a plurality of fuel cell units, and the output itself is extremely stabilized, and a fastening method therefor.

In order to achieve the object described above, according to the first aspect of the present invention, there is provided a fuel cell comprising a plurality of stacked fuel cell units each including an anode electrode plate and a cathode electrode plate, a separator or a fastening pressure-generating plate inserted at a predetermined position, a chamber defined at the inside of the separator or the fastening pressure-generating plate, and a filler provided in the chamber, the filler being expandable or contractible in accordance with absorption or release of heat, wherein the separator or the fastening force-generating plate is displaced in at least any one of directions toward the anode electrode plate and the cathode electrode plate as a result of the absorption or release of heat effected by the filler, so that fastening force exerted on the respective fuel cell units is increased or decreased.

According to the second aspect of the present invention, there is provided a fuel cell comprising a plurality of stacked fuel cell units each including an anode electrode plate and a cathode electrode plate, a separator or a fastening pressure-generating plate inserted at a predetermined position, a chamber defined at the inside of the separator or the fastening pressure-generating plate, and a filler provided in the chamber, the filler being deformable in accordance with absorption or release of heat, wherein the separator or the fastening force-generating plate is displaced in at least any one of directions toward the anode electrode plate and the cathode electrode plate as a result of deformation of the filler, so that fastening force exerted on the respective fuel cell units is increased or decreased.

According to the third aspect of the present invention, there is provided a fuel cell comprising a plurality of stacked fuel cell units each including an anode electrode plate and a cathode electrode plate, a separator or a fastening pressure-generating plate inserted at a predetermined position, a chamber defined at the inside of the separator or the fastening pressure-generating plate, and a filler provided in the chamber, the filler being expandable or contractible in accordance with chemical reaction, wherein the separator or the fastening force-generating plate is displaced in at least any one of directions toward the anode electrode plate and the cathode electrode plate as a result of expansion or contraction of the filler, so that fastening force exerted on the respective fuel cell units is increased or decreased.

According to the fourth aspect of the present invention, there is provided a fuel cell comprising a plurality of stacked fuel cell units each including an anode electrode plate and a cathode electrode plate, a separator or a fastening pressure-generating plate inserted at a predetermined position, a chamber defined at the inside of the separator or the fastening pressure-generating plate, a first filler provided in the chamber, the first filler being expandable or contractible in accordance with absorption or release of heat, and a second filler provided in the chamber, the second filler being expandable or contractible in accordance with chemical reaction, wherein the separator or the fastening force-generating plate is displaced in at least any one of directions toward the anode electrode plate and the cathode electrode plate as a result of the absorption or release of heat effected by the first filler and the chemical reaction effected by the second filler, so that fastening force exerted on the respective fuel cell units is increased or decreased.

According to the fifth aspect of the present invention, there is provided a fuel cell comprising a plurality of stacked fuel cell units each including an anode electrode plate and a cathode electrode plate, a separator or a fastening pressure-generating plate inserted at a predetermined position, a chamber defined at the inside of the separator or the fastening pressure-generating plate, a first filler provided in the chamber, the first filler being capable of causing thermal decomposition in accordance with absorption or release of heat, and a second filler provided in the chamber, the second filler being capable of producing gas in accordance with chemical reaction, wherein a volume of the chamber is expanded by the thermal decomposition or production of gas, and thus the separator or the fastening force-generating plate is displaced in at least any one of directions toward the anode electrode plate and the cathode electrode plate, so that fastening force exerted on the respective fuel cell units is increased or decreased.

According to the sixth aspect of the present invention, there is provided a fuel cell comprising a plurality of stacked fuel cell units each including an anode electrode plate and a cathode electrode plate, and a separator or a fastening pressure-generating plate inserted at a predetermined position, wherein a part of the separator or the fastening force-generating plate is displaced in at least any one of directions toward the anode electrode plate and the cathode electrode plate as a result of heat, so that fastening force exerted on the respective fuel cell units is increased or decreased.

According to the seventh aspect of the present invention, there is provided a method for fastening a fuel cell comprising a plurality of stacked fuel cell units each including an anode electrode plate and a cathode electrode plate, the method comprising the steps of supplying a refrigerant to a filler disposed in a cooling space defined at the inside of a separator or a fastening pressure-generating plate, swelling the filler with the refrigerant, and mutually fastening the large number of stacked fuel cell units by using force generated by swelling action.

According to the first invention, for example, the filler in the chamber is expanded at a predetermined temperature. As a result, the separator or the fastening force-generating plate presses the anode electrode plate or the cathode electrode plate under the swelling action of the filler. Consequently, the pressing action allows the electrode plate to further ensure tight contact, resulting in decrease in ion conductive resistance and contact resistance. Therefore, it is possible to obtain stable output from the fuel cell.

On the other hand, when one which is contractible at a predetermined temperature is selected as the filler provided in the chamber, the filler is expanded by incorporating the fuel cell units in a state of contraction at the predetermined temperature beforehand, and then restoring the temperature of the fuel cell to its operating temperature. Accordingly, the anode electrode plate or the cathode electrode plate is pressed in the same manner as described above.

In the second invention, the member, which makes deformation in accordance with the absorption or release of heat, is selected as the filler. Therefore, the deformation of the filler at a predetermined temperature induces the displacement action of the anode electrode plate or the cathode electrode plate, resulting in improvement in tight contact of the electrode plate.

In the third invention, the member, which makes expansion or contraction in accordance with the chemical reaction, is selected as the filler. Therefore, in this invention, the filler makes expansion or contraction as a result of the chemical reaction, and thus the same action as those effected in the foregoing two inventions is effected.

In the fourth invention, the first filler, which makes expansion or contraction in accordance with the absorption or release of heat, is used together with the second filler which makes expansion or contraction in accordance with the chemical reaction. Therefore, the anode electrode plate or the cathode electrode plate is displaced by the first filler or the second filler in a selective manner or by both of the anode electrode plate and the cathode electrode plate in combination. Thus it is possible to adjust the fastening pressure.

In the fifth invention, the first filler, which causes the thermal decomposition in accordance with the absorption or release of heat, is used together with the second filler which produces gas in accordance with the chemical reaction. Accordingly, the volume of the chamber is expanded by the thermal decomposition of the first filler or by the production of gas from the second filer so that any one of the anode electrode plate and the cathode electrode plate is displaced. As a result, the fastening pressure exerted on the fuel cell units is increased.

In the sixth invention, the fillers, which are specified by the first to fifth inventions, are not especially used. Instead, the separator or the fastening pressure-generating plate is directly deformed by means of heat to increase the contact pressure with respect to the anode electrode plate or the cathode electrode plate. Accordingly, the same effect as those obtained in the first to fifth inventions is also obtained.

In the seventh invention, the force of tight contact on the anode electrode plate or the cathode electrode plate is increased by supplying the refrigerant to the filler disposed in the chamber provided at the inside of the separator or the fastening pressure-generating plate, and swelling the filler with the refrigerant. The same effect as those obtained in the first to sixth inventions is obtained.

BRIEF DESCRIPTION OF THE DRAWINGS

FIG. 4 shows an exploded cross-sectional view illustrating the fuel cell shown in FIG. 1.

FIG. 19 shows characteristic curves illustrating the relationship of the temperature, the fastening pressure, and the current density, obtained when an ion exchange resin is used as a filler.

FIG. 23 shows characteristic curves illustrating the relationship of the temperature, the fastening pressure, and the current density for generating the fastening pressure by adding a chemical substance.

BEST MODE FOR CARRYING OUT THE INVENTION

Figure 1:
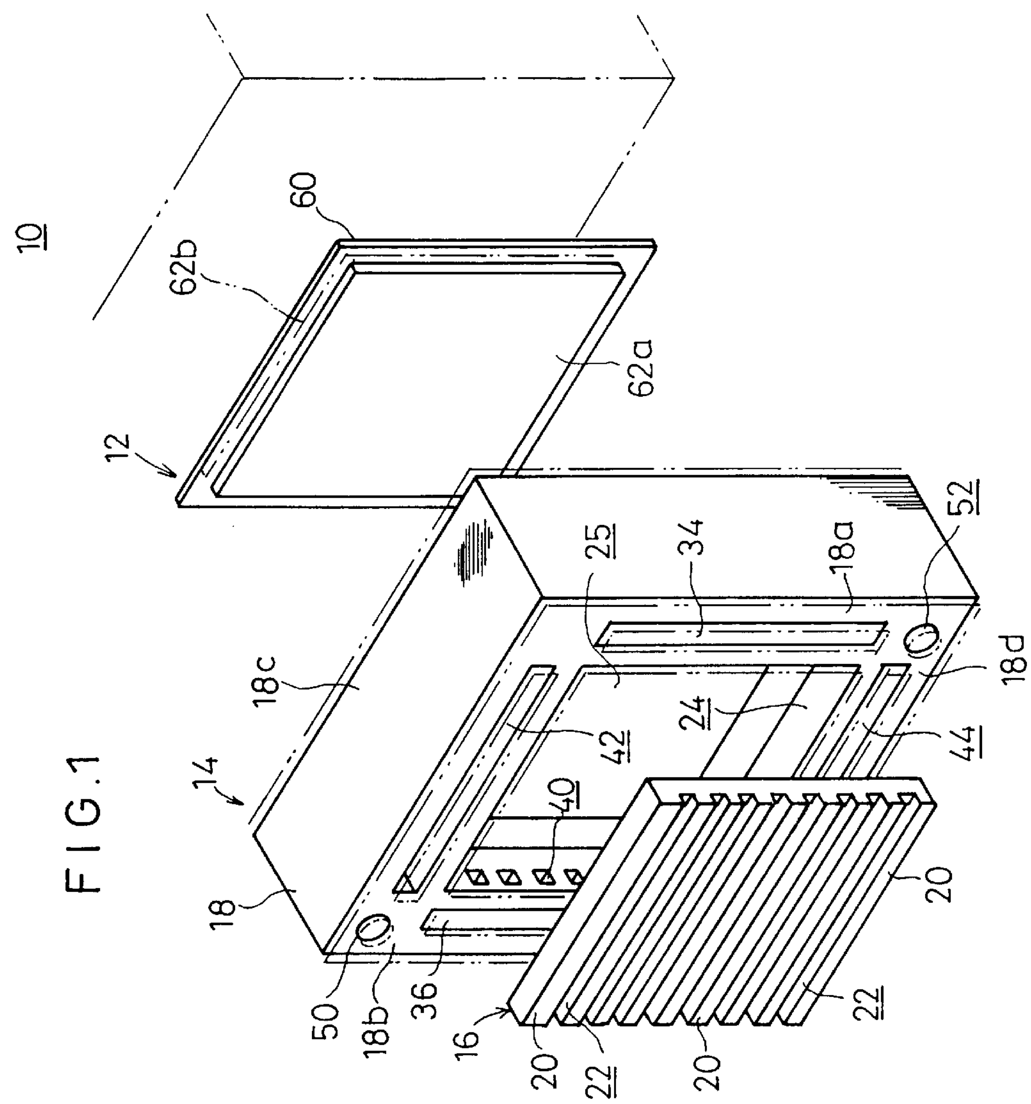
FIG. 1 shows an exploded perspective view, with partial omission, illustrating a fuel cell according to the present invention.
Figure 2:
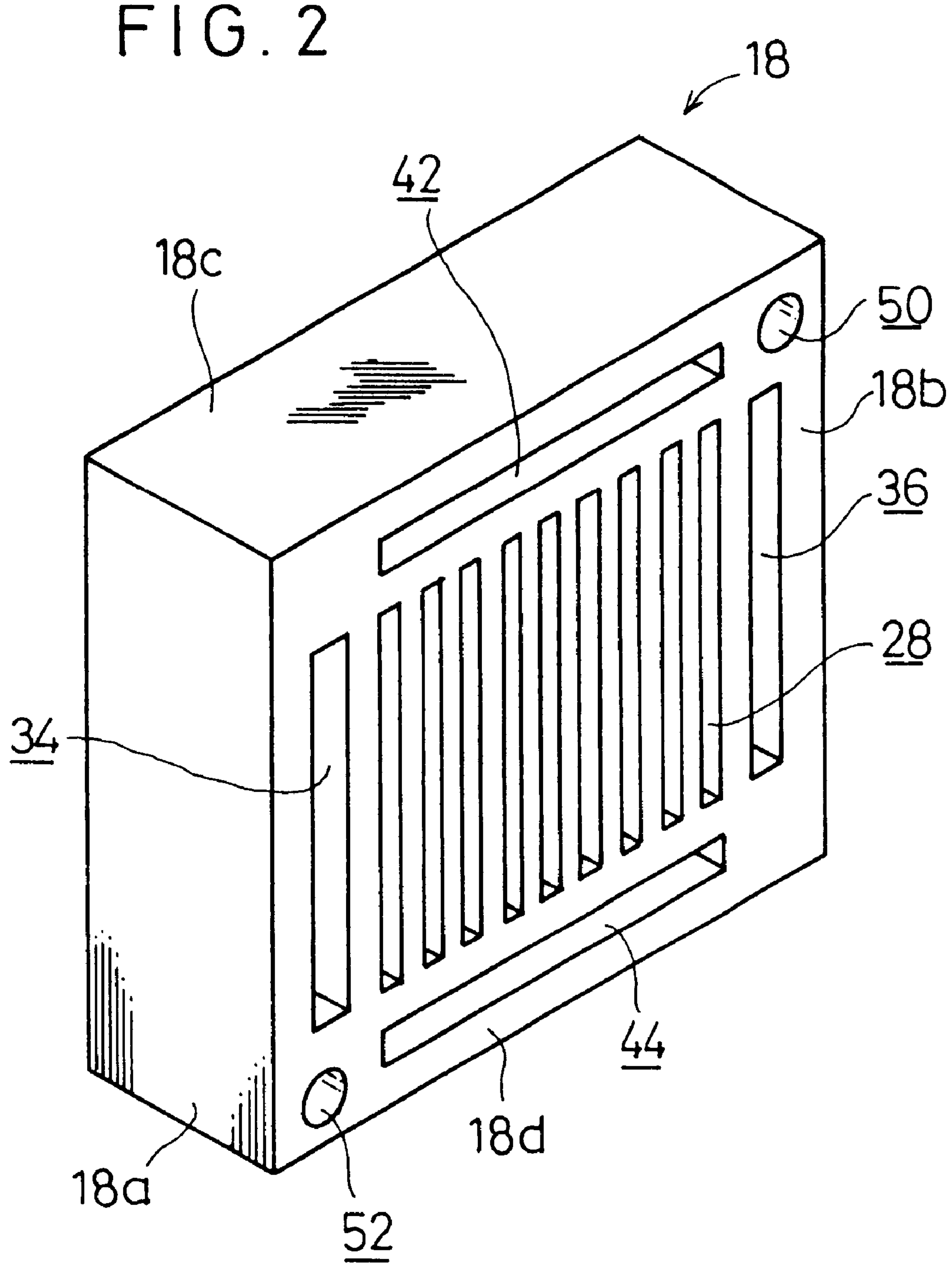
FIG. 2 shows a perspective view illustrating a separator as viewed in another direction.
Figure 3:
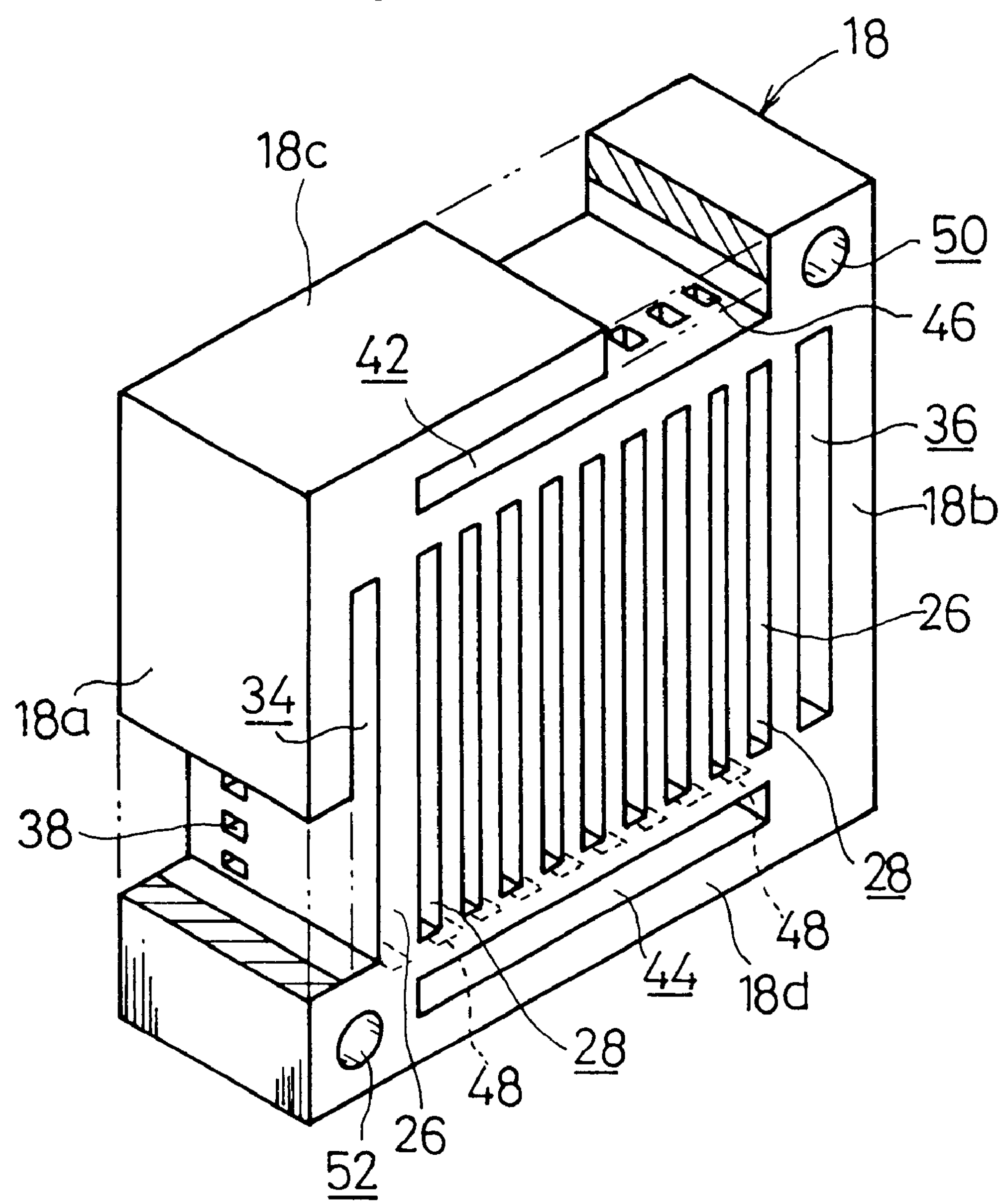
FIG. 3 shows a perspective view, with partial cutout, illustrating the separator shown in FIG. 2.

The fuel cell according to the present invention will be explained in detail below with reference to the accompanying drawings in relation to the fastening method therefor as exemplified by preferred embodiments.

A fuel cell 10 referred to herein is a fuel cell of the solid polymer oxide type.

In the embodiment according to the present invention, the fuel cell of the solid polymer oxide type is referred to as a preferred embodiment. However, especially, the pressurizing structure of the separator section is substantially uniform to those for the direct methanol/air fuel cell, the alkali electrolyte type fuel cell, the phosphonic acid type fuel cell, the molten carbonate type fuel cell, and the solid oxide type fuel cell. Accordingly, the present invention is also applicable to these fuel cells.

As shown in FIGS. 1 to 4, the fuel cell 10 basically comprises a power-generating section 12 and a separator section 14. The separator section 14 includes a first separator 16 and a second separator 18 each composed of a dense material. As clearly understood from the drawings, the rectangular-shaped first separator 16 is provided with a plurality of ribs 20 which are allowed to protrude in parallel to one another in the lateral direction. Passages 22 for supplying the fuel gas are defined between the adjacent ribs 20, 20. On the other hand, as shown in FIG. 4, the second separator 18 has an approximately C-shaped cross section with a hole 24 defined on a side of its first side surface for fitting the first separator 16 therein. The hole 24 communicates with a chamber 25 defined in the second separator 18. A plurality of ribs 26 are provided in a protruding manner in parallel to one another in the vertical direction on a side of a second side surface of the second separator 18. Accordingly, passages 28 are defined between the adjacent ribs 26, 26, for supplying the oxygen-containing gas such as air (see FIGS. 2 and 3).

The second separator 18 will be further explained. As clearly understood from FIGS. 1 to 3, a rectangular parallelepiped-shaped through hole 34 is defined through a left frame **18*a* of the second separator 18, and another through hole 36 is defined through a right frame 18*b*. A plurality of small holes 38, which communicate from the through hole 34 to the hole 24, are defined through the left frame 18*a*. On the other hand, a plurality of small holes 40, which communicate from the through hole 36 to the hole 24, are defined through the right frame 18*b* (see FIG. 1). Therefore, when the first separator 16 is fitted to the hole 24 of the second separator 18, the small holes 38 mutually communicate with the small holes 40 via the passages 22 of the first separator 16. As easily and clearly understood from FIG. 4, when the first separator 16 is fitted to the hole 24 of the second separator 18, a seal member 30 made of, for example, conductive synthetic resin rubber or conductive resin is attached between the first separator 16 and the second separator 18**.

On the other hand, a rectangular parallelepiped-shaped through hole 42 is defined through an upper frame **18*c* of the second separator 18, and another through hole 44 is defined through a lower frame 18*d* respectively. A plurality of small holes 46, which communicate from the through hole 42 to the passages 28, are defined through the upper frame 18*c*, and a plurality of small holes 48, which communicate from the through hole 44 to the passages 28, are defined through the lower frame 18*d*. Therefore, the plurality of small holes 46 and the small holes 48 are in a state of mutual communication via the passages 28**.

A communicating hole 50 is defined at a corner which is formed by the upper frame **18*c* and the left frame 18*a* of the second separator 18. A communicating hole 52 is defined at a corner which is formed by the lower frame 18*d* and the right frame 18*b*. The communicating holes 50, 52** communicate, in oblique directions, with the chamber 25 which is defined by fitting the first separator 16 to the hole 24 of the second separator 18 (see FIG. 4).

Next, the power-generating section 12 will be explained. The power-generating section 12 comprises a solid polymer oxide 60, and a first electrode catalyst layer 62*a* and a second electrode catalyst layer 62*b* disposed on both side surfaces thereof. Each of the first and second electrode catalyst layers 62*a*, 62*b* has a size which is approximately the same as that of an inner end edge of the second separator 18 for defining the hole 24. The drawings exemplarily show the structure in which the solid polymer oxide 60 and the electrode catalyst layers 62*a*, 62*b* are constructed in an integrated manner. However, it is a matter of course that the solid polymer oxide 60 and the electrode catalyst layers 62*a*, 62*b* may be constructed in a separate manner respectively.

Figure 5:
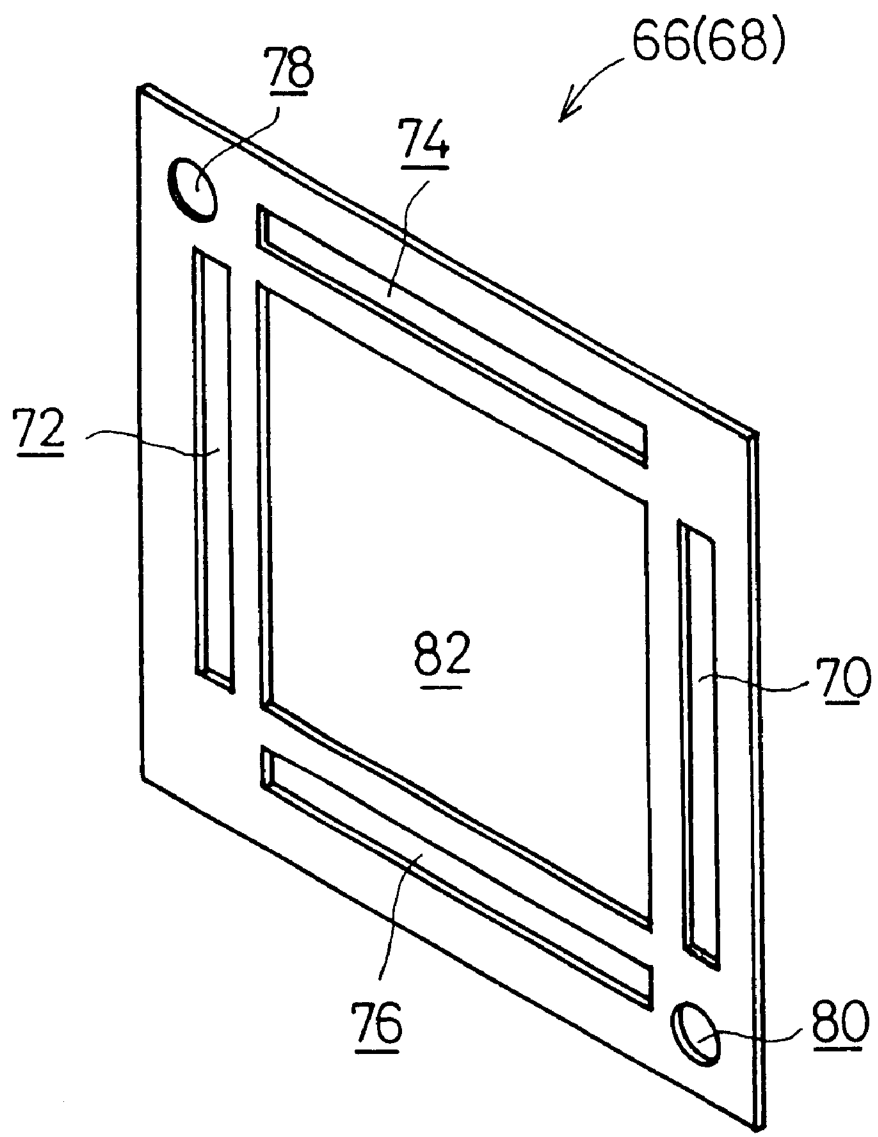
FIG. 5 shows a perspective view illustrating a gasket to be incorporated into the fuel cell shown in FIG. 1.

FIG. 5 shows a structure of a gasket 66. A gasket 68 has substantially the same shape as that of the gasket 66. Therefore, the gasket 66 will be explained in detail, and explanation for the gasket 68 will be omitted. As shown in FIG. 4, each of the gaskets 66, 68 is interposed between the second separator 18 and the solid polymer oxide 60. Each of the gaskets 66, 68 is defined with through holes 70, 72, 74, 76, communicating holes 78, 80, and a large hole 82, in order to allow the fuel gas and the oxygen-containing gas to flow through the plurality of first separators 16 and the second separators 18 stacked to form the fuel cell 10 as described later on. Therefore, when the power-generating section 12 and the separator section 14 are incorporated, then the through hole 34 of the second separator 18 communicates with the through hole 70 of the gasket 66, 68, the through hole 36 communicates with the through hole 72, the through hole 42 communicates with the through hole 74, and the through hole 44 communicates with the through hole 76. The plurality of ribs 20 of the first separator 16 enter the large hole 82.

In the embodiment of the present invention, a filler 83 composed of any one of fillers 83*a* to 83*g* or a combination thereof is disposed in the chamber 25 defined in the second separator 18. The location, at which the filler 83 is disposed, is not limited to the inside of the chamber 25. The filler 83 may be disposed in the communication holes 50, 52.

Figure 6:
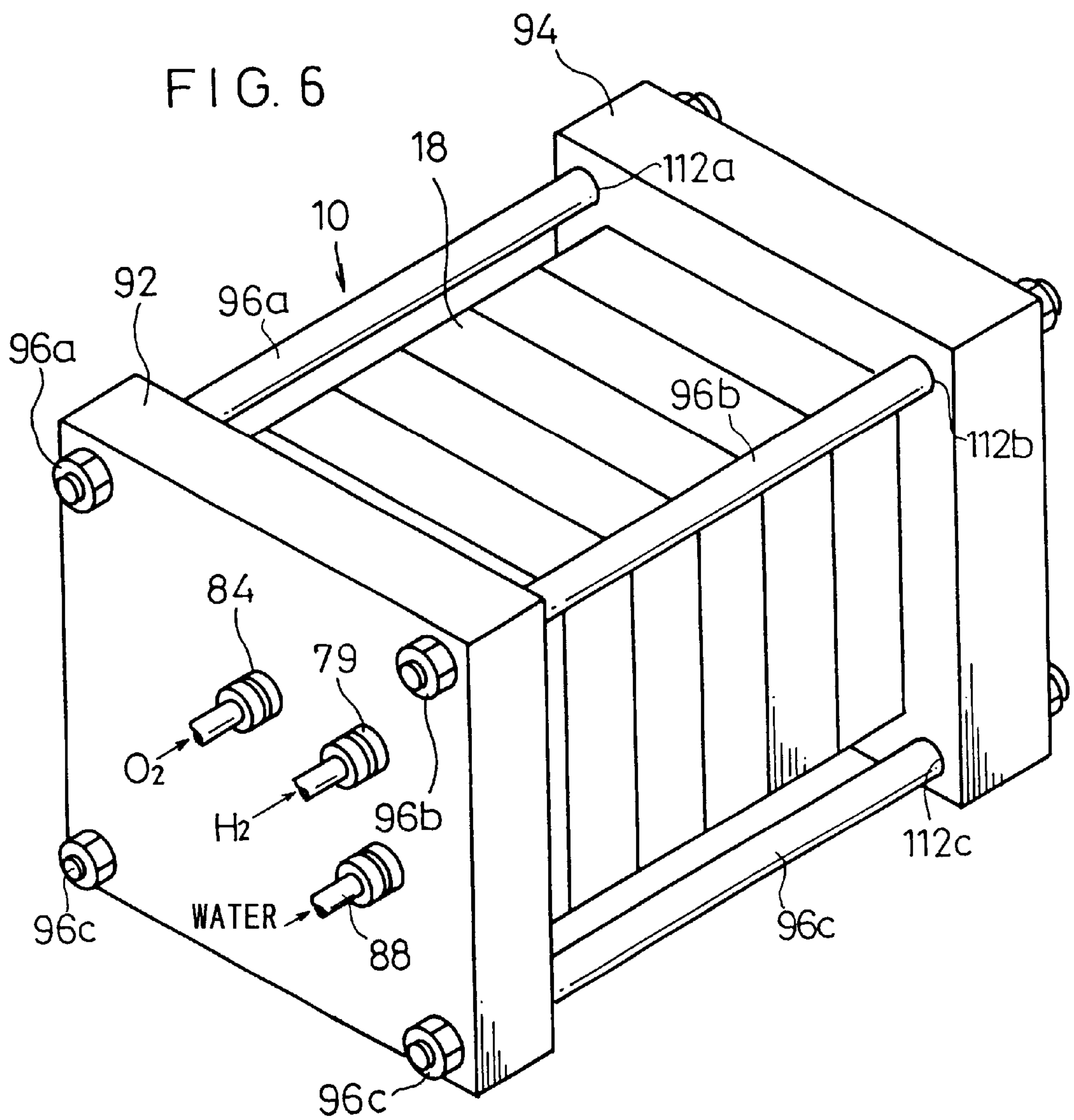
FIG. 6 shows a perspective view illustrating an assembled state of fuel cell units as shown in FIG. 1.

The power-generating section 12 and the separator section 14 constructed as described above are combined as follows. Namely, the first separator 16 is fitted to the hole 24 of the second separator 18. The seal member 30 seals the first separator 16 and the second separator 18 and makes an electrical connection there between. In this embodiment, a sufficient amount of the filler 83 is arranged beforehand in the chamber 25. In the embodiment of the present invention, a cation exchange resin or an anion exchange resin is adopted as the filler 83. Accordingly, when the first separator 16 is fitted to the hole 24 of the second separator 18, the cation exchange resin or the anion exchange resin, which constitutes the filler 83, is pressed by the first separator 16 in a degree to contract its volume. Next, the gasket 66 is fitted to the second separator 18 on the side of the first separator 16. The gasket 68 is joined to the surface of the second separator 18 on the side of the ribs 26. Subsequently, the power-generating section 12 is inserted between the gasket 66 and the gasket 68. As shown in FIG. 6, when the components are stacked and fixed, the fuel cell 10 is arranged with, at its both ends, an end plate 92 which has tube fittings 79, 84 communicating with the through holes 34, 42 of the second separator 18 and a tube fitting 88 communicating with the communicating hole 52, and an end plate 94 which is installed with tube fittings 81, 86 communicating with the through holes 36, 42 and a tube fitting 90 communicating with the communicating hole 50. The fuel cell 10 is clamped strongly and uniformly at its four corners by using clamping bolts 96*a* to 96*d*.

Figure 7:
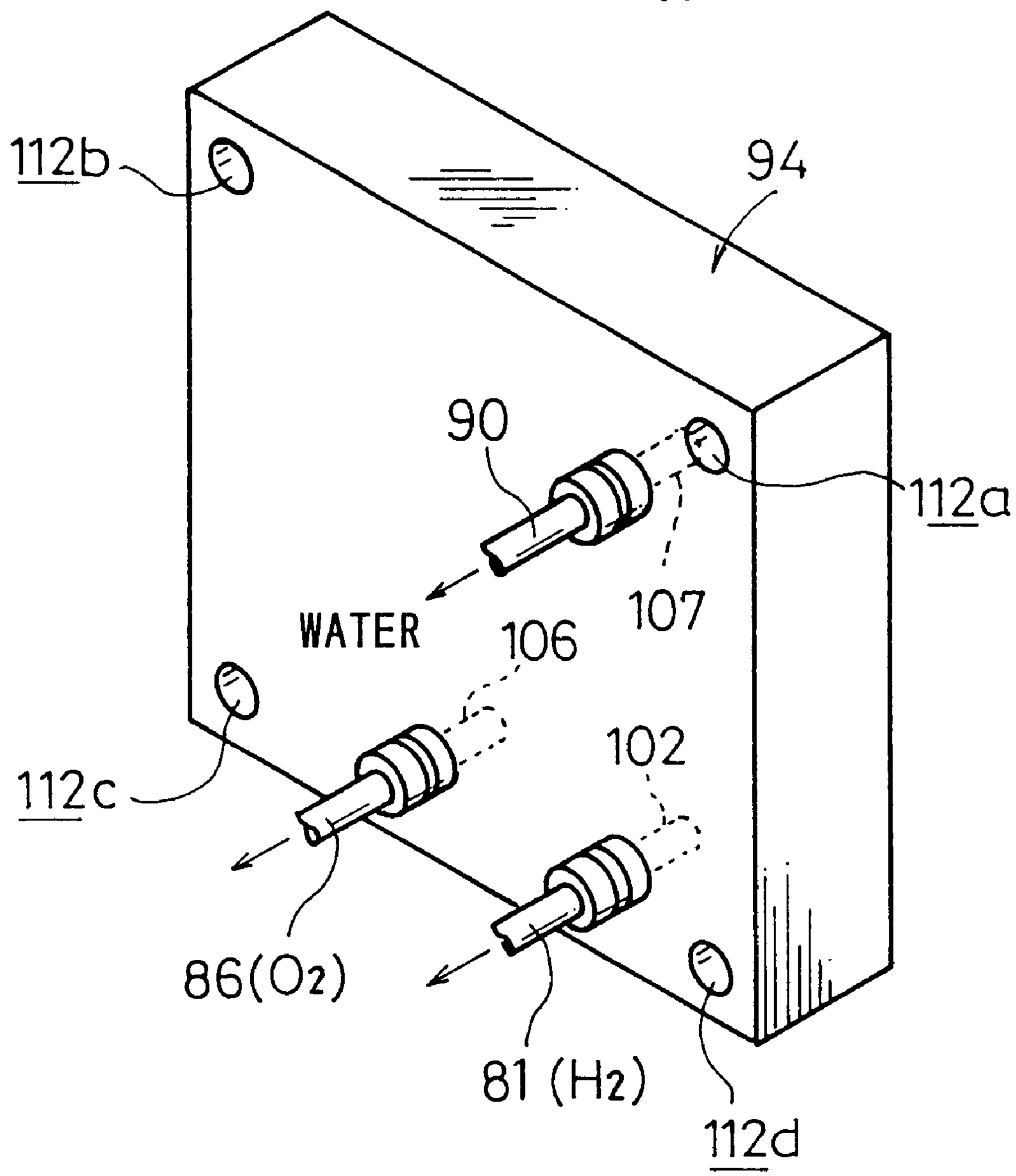
FIG. 7 shows a perspective view illustrating one end plate.

The end plate 94 is shown in detail in FIG. 7. The end plate 94 is composed of a plate having substantially the same size as that of the end plate 92, which is defined with a hole 102 communicating with the tube fitting 81 corresponding to the through hole 36 of the second separator 18, and a hole 106 communicating with the tube fitting 86 corresponding to the through hole 44. The end plate 94 is further defined with a hole 107 communicating with the tube fitting 90 corresponding to the communicating hole 50. In FIG. 7, reference numerals 112*a* to 112*d* indicate clamping holes into which first ends of the clamping bolts 96*a* to 96*d* are inserted.

Now, the filler 83 to be charged in the chamber 25 beforehand will be explained. As described above, the filler 83 may be classified as follows:

(1) filler 83*a* which makes expansion or contraction in accordance with absorption or release of heat;
(2) filler 83*b* which makes deformation in accordance with absorption or release of heat;
(3) filler 83*c* which makes expansion or contraction in accordance with chemical treatment;
(4) filler 83*d* which is composed of a substance charged in the chamber 25 to be thermally decomposed by itself as caused by the operating temperature of the fuel cell, or which produces gas having a boiling point at a temperature lower than the operating temperature of the fuel cell in accordance with chemical reaction between charged substances;
(5) filler 83*e* which produces gas in accordance with absorption or release of heat;
(6) filler 83*f* which releases or absorbs gas in accordance with absorption or release of heat; and
(7) filler 83*g* which makes displacement in accordance with heat.

Of course, it is allowable to use an arbitrary combination of two or more of the foregoing fillers 83, or use a combination of all of the foregoing fillers 83 provided that no inconvenience occurs.

Next, the fillers 83*a* to 83*g* of the foregoing items (1) to (7) will be illustrated.

For Filler 83*a* of (1)

The filler 83*a* is preferably a substance which has a boiling point at a temperature not higher than the operating temperature of the fuel cell. In this case, the filler 83*a* may be a substance or substances which exhibit reactivity of the substance by itself or between the substances, a substance which exhibits no reactivity with the constitutive elements of the fuel cell with which the substance makes contact, or a mixture of the substance which exhibits reactivity and the substance which exhibits no reactivity. Those preferably adopted include the following substances:

- inorganic compounds:
  - water, ammonia, carbon dioxide (including dry ice), argon, nitrogen, hydrogen, helium, neon, radon, xenon, krypton, and oxygen;
- organic compounds:
  - alcohols: methanol, ethanol, and isopropanol;
  - aldehydes/ketones: acetoaldehyde, acetone, ethyl methyl ketone, and formaldehyde;
  - ethers: ethyl propyl ether, ethyl methyl ether, diethyl ether, dimethyl ether, and diisopropyl ether;
  - saturated hydrocarbons: methane, ethane, propane, butane, pentane, isopentane, hexane, and isohexane;
  - cyclic compounds: cyclobutane, cyclopropane, cyclohexane, cyclopentane, hexafluorobenzene, and perfluorocyclohexane;

esters: methyl formate, ethyl formate, methyl acetate, ethyl acetate, and vinyl acetate.

For Filler 83*b* of (2)

The filler 83*b* may be a shape-memory alloy which brings about the memory effect to make deformation in one direction or two directions or a combination of such shape-memory alloys. Those preferably used include, for example, nickel-titanium alloys and copper-zinc-aluminum alloys. In this case, it is preferable that the shape-memory alloy has a coil spring-shaped configuration or a random coil-shaped configuration.

The filler 83*b* may be a shape-memory resin. Those preferably used as such a shape-memory resin include polynorbornene resin, polymer alloy containing a major component of polyester, urethane elastomer, and trans-polyisoprene cross-linked resin.

For Filler 83*c* of (3)

The filler 83*c* is composed of a cation exchange resin, an anion exchange resin, or a mixture of cation and anion exchange resins. Such an ion exchange resin is formed to have a spherical configuration or a membrane-shaped configuration. The ionic form of the functional group of such an ion exchange resin changes depending on the change in degree of its dry state and wet state, or on the chemical treatment based on the use of an acidic or alkaline aqueous solution or an aqueous solution of salt, and thus the ion exchange resin makes swelling, contraction, or deformation. The present invention utilizes the states as described above.

The cation exchange resin has any one of backbone structures selected from a styrene system, a methacrylic system, an acrylic system, a teflon system, and a pyridine system, and it has any one of functional groups selected from a sulfonic acid group, a carboxylic acid group, an aminophosphoric acid group, a pyridine group, a dithiocarbamic acid group, an iminodiacetic acid group, and an aminocarboxylic acid group.

The anion exchange resin has any one of backbone structures selected from a styrene system, a methacrylic system, an acrylic system, a phenol system, and a teflon system, and it has any one of functional groups selected from a quaternary ammonium base, a secondary amine group, a tertiary amine group, and a polyamine group.

The change in ionic form of the functional group associated with expansion is exemplified as follows. Namely, those preferably selected for the cation exchange resin include Na form→H form, H form→Na form, and H form→ammonium form. On the other hand, those preferably selected for the anion exchange resin include Cl form→OH form and OH form→Cl form.

Alternatively, the filler 83*c* may be a water-absorptive gel or a water-absorptive resin. A certain kind of water-absorptive gel or water-absorptive resin undergoes change in its form depending on the degree of the dry state or the wet state. Those preferably used include, for example, acrylic acid, vinyl alcohol copolymer, and sodium acrylate polymer.

The filler 83*c* may be a smectite clay mineral or polyamide or a hybrid material thereof, because of the following reason. Namely, the form changes depending on the degree of the wet state brought about in accordance with the amount of fluid introduced into such materials.

In addition to the inorganic compounds and the organic compounds described above, aromatic compounds such as benzene and toluene may be utilized as the filler 83*c*.

The filler 83*c*, which makes expansion or contraction in accordance with the chemical treatment, may be the cation exchange resin, the anion exchange resin, the water-absorptive gel or resin, the smectite clay mineral, the polyamide, the hybrid material thereof, or a mixture thereof.

It is also preferable to use a substance or a mixture of a plurality of substances which do not cause any reaction with the constitutive elements of the fuel cell with which the substances make contact, as a combination of the filler which makes expansion or contraction in accordance with the chemical treatment, the filler being the substance such as the inorganic compound, the organic compound, the smectite clay mineral, or the polyamide as described above, and the filler which makes expansion or contraction in accordance with absorption or release of heat, in which the both do not cause any reaction.

For Filler 83*d* of (4)

Those usable as the filler 83*d* include simple substances or a combination of substances to produce hydrogen gas, nitrogen gas, carbon dioxide gas, ammonia gas, and oxygen gas, and simple substances or a combination of substances to produce water. In this embodiment, the following substances are preferred:

a. simple substances or a combination of substances to produce hydrogen gas;

b. metal and acid: zinc or transition metal and hydrochloric acid, and alkaline earth metal and acid;

c. metal and base: aluminum or silicon and sodium hydroxide, and alkaline metal and ammonia;

d. metal and water: alkaline metal or alkaline earth metal and water;

e. metal and alcohol: alkaline metal or alkaline earth metal and alcohol;

f. metal hydride and water: lithium hydride or hydride of alkaline earth metal and water, and sodium boron hydride or sodium aluminum hydride and water.

For Fillers 83*e*, 83*f* of (5) and (6)

Those preferably used as the fillers 83*e*, 83*f* include metal hydrides which exhibit a hydrogen release pressure not lower than the atmospheric pressure at a temperature not higher than the fuel cell-operating temperatures described below:

solid polymer oxide type fuel cell: not more than about 120° C.;

direct methanol/air fuel cell: not more than about 100° C.;

alkali electrolyte type fuel cell: not more than about 100° C.;

phosphonic acid type fuel cell: not more than about 200° C.;

molten carbonate type fuel cell: not more than about 650° C.; and solid oxide type fuel cell: not more than about 1000° C.

For Filler 83*g* of (7)

Those preferably used as the filler 83*g* include shape-memory alloys having an operating temperature not higher than the following operating temperature for the fuel cell, of the shape-memory alloys referred to in the foregoing item (2):

solid polymer oxide type fuel cell: not more than about 120° C.;

direct methanol/air fuel cell: not more than about 100° C.;

alkali electrolyte type fuel cell: not more than about 100° C.;

phosphonic acid type fuel cell: not more than about 200° C.;

molten carbonate type fuel cell: not more than about 650° C.; and solid oxide type fuel cell: not more than about 1000° C.

Next, the operation of the fuel cell constructed as described above according to the embodiment of the present invention will be explained. As shown in FIG. 6, upon the operation of the fuel cell 10 constructed by stacking the unit fuel cells, the fuel gas is supplied from an unillustrated fuel gas supply source to the passages 22 of the first separator 16 via the tube fitting 79 of the end plate 92, the through hole 70 of the gasket 66 (68), and the through hole 34 and the small holes 38 of the second separator 18, while the oxygen-containing gas is supplied from an unillustrated oxygen-containing gas supply source to the passages 28 via the tube fitting 84 of the end plate 92, the through hole 74 of the gasket 66 (68), and the through hole 42 and the small holes 46 of the second separator 18.

Simultaneously, water or a mixed liquid of water and alcohol as cooling water is supplied from the tube fitting 88 of the end plate 92 to the communicating hole 52, and it arrives at the chamber 25 charged with the filler 83 so that the internal pressure in the chamber 25 is increased. In the embodiment of the present invention, the cation exchange resin or the anion exchange resin is disposed as the filler 83*c*. Therefore, the filler 83*c* swells when it is impregnated with water. As a result, the first separator 16 is displaced or deformed toward the electrode catalyst layer 62*b*. Therefore, the ribs 20 of the first separator 16 uniformly contact with the electrode catalyst layer 62*b* under the pressure in accordance with the displacing action or the deforming action effected by the filler 83*c* and the first separator 16. Consequently, the solid polymer oxide 60 is allowed to contact with the second separator 18 under the pressure. Accordingly, the ionic conductivity and the electronic conductivity are not deteriorated, and the contact resistance is not increased, but it is inversely decreased. On the other hand, unreacted fuel gas of the fuel gas supplied to the passages 22 passes through the through hole 36, and it is discharged from the tube fitting 81 via the hole 102 of the end plate 94. The oxygen-containing gas undergoes the same operation. Namely, a part of the oxygen-containing gas arrives at the through hole 44 of the second separator 18, and it is discharged from the tube fitting 86.

When the operation of the fuel cell 10 is completed, and the inflow of the water or mixed liquid of water and alcohol is stopped, then the water in the chamber 25 is discharged to the outside from the tube fitting 90 of the end plate 92 via the communicating hole 52 of the second separator 18. When the water content of the ion exchange resin is lowered, the internal pressure of the chamber 25 is lowered. Therefore, the surface pressure exerted toward the first separator 16 is also lowered, and the pressure is restored to the pressure upon assembly.

As described above, according to the fuel cell concerning the embodiment of the present invention, the pressing force exerted on the solid polymer oxide 60 is increased all at once owing to the swelling action of the filler 83*c* and the deforming action of the first separator 16 by introducing water into the chamber 25 defined by the first separator 16 and the second separator 18. Accordingly, the contact resistance is never increased.

The amount of water supply is increased or decreased depending on the state of dryness of the power-generating section 12. During this process, the water is directly supplied from the chamber 25 defined in the fuel cell 10. Therefore, quick response is obtained with respect to the wetness state of the solid polymer oxide 60.

The pressure of supplied water ($PH_2O$) is set to be higher than those of hydrogen as ($PH_2$) as the fuel gas and oxygen gas ($PO_2$) as the oxygen-containing gas. Further, the second separator 18 is composed of the dense material. Accordingly, water enters only the passages 22 of the first separator 16, and it is possible to reliably prevent the fuel gas and the oxygen-containing gas from being mixed in the chamber 25. Thus it is possible to ensure safety.

In the embodiment described above, water is selected as the fluid. However, instead of water, it is possible to use alcohol or a mixed solution of water and alcohol as described above, or a mixed solution of water and methanol. In the case of the mixed solution of water and methanol, when the constitutive element of the separator 18 on the side of the anode is a porous material in place of the dense material, the mixed solution of water and methanol is supplied to the anode electrode plate. Accordingly, it is possible to provide a direct type methanol fuel cell.

Further, when the ion exchange resin is adopted as the filler 83*c*, and water as the refrigerant is supplied to the chamber 25, then it is possible to allow the inside of the chamber 25 to function as a water management section for maintaining the quality of cooling water. Namely, the ion exchange resin can be used to remove, for example, cation of other metal ions feared to be eluted from the cell stack, or remove carbonate ion produced due to mixing of carbon dioxide gas in the atmospheric air into the cooling water.

Figure 8:
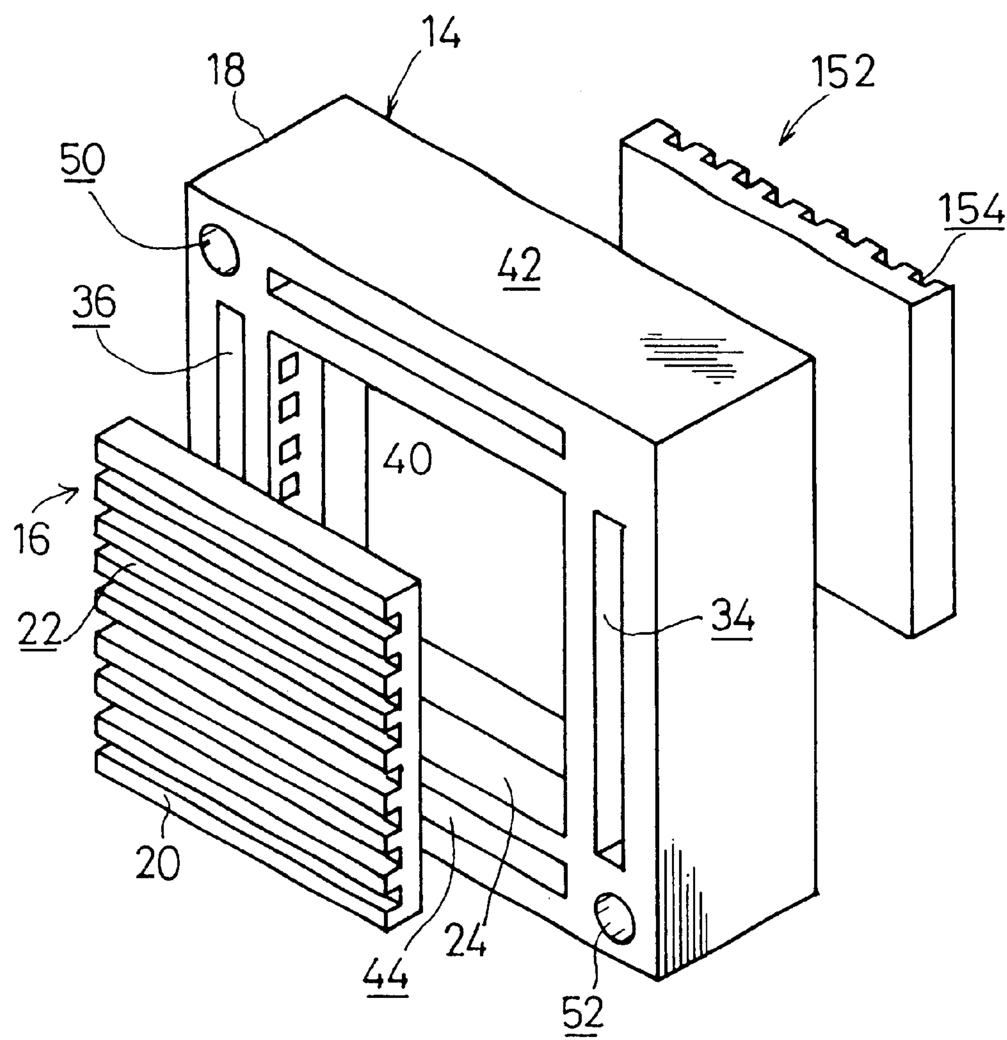
FIG. 8 shows an exploded perspective view illustrating a separator according to another embodiment.

In the first embodiment described above, the separator section 14 is constructed in a separated manner as the first separator 16 and the second separator 18. However, it is possible to further separate the second separator 18 into a third separator 152 and a main separator body 150 in which the chamber 25 is defined. This arrangement is shown in FIG. 8.

The third separator 152 is fitted to a hole defined in the main separator body 150 on a side opposite to the first separator 16. The third separator 152 has a large number of oxygen-containing gas supply passages 154 defined in parallel to one another to extend in the same vertical direction as that of the oxygen-containing gas supply passages 28, in the same manner as the second separator 18 shown in FIG. 2. In the embodiment shown in FIG. 8, the filler, which is composed of any one of the fillers 83*a* to 83*g* or an arbitrary combination thereof, is disposed in the chamber 25 defined between the first separator 16 and the third separator 152. Therefore, when the filler 83*a* to 83*g* is composed of the filler described in the foregoing items (1) to (8), the first separator 16 and the third separator 152 are deformed in the direction to make separation from each other in accordance with, for example, the temperature and the chemical reaction. Thus the pressing force on the electrode catalyst layers 62*a*, 62*b* is increased.

In the embodiment described above, in order to cool the fuel cell 10, or in order to increase the force to tightly clamp the fuel cell 10, the chambers 25 are charged with the filler 83, and the respective chambers 25 communicate with each other over the Individual unit fuel cells. This system Is referred to herein as "open type".

Figure 9:
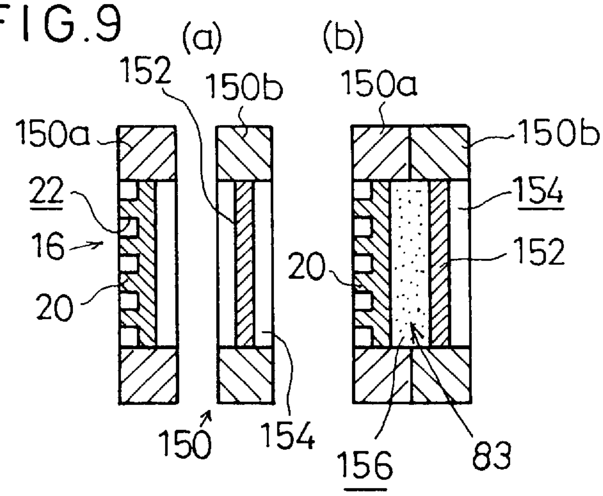
FIG. 9 shows a schematic cross-sectional view illustrating a separator according to the present invention.

Apart from the open type, it is assumed to provide a fuel cell to be referred to as "closed type". Namely, those referred to as the closed type have a structure in which the chamber 25 of one unit fuel cell is excluded from communication with the chamber 25 of another unit fuel cell. Specifically, it is possible to assume a structure in which the communicating passages 50, 52 described in the foregoing embodiment are not provided. The structure of the closed type fuel cell is schematically shown in FIGS. 9, 10, and 11.

In these drawings, the same constitutive elements as those of the foregoing embodiment are designated by the same reference numerals, detailed explanation of which will be omitted. As easily and clearly understood from these drawings, the main separator body 150 is constructed in a separated manner as a main anode separator body 150*a* and a main cathode separator body 150*b*. The first separator 16 is fitted to the main anode separator body 150*a*, while the third separator 152 is fitted to the main cathode separator body 150*b*. A chamber 156 for charging the filler 83 is defined between the main separator bodies 150*a*, 150*b*. Passages 154 for supplying the oxygen-containing gas are defined in the third separator 152 so that the passages 154 are perpendicular to the passages 22 of the first separator 16.

Figure 10:
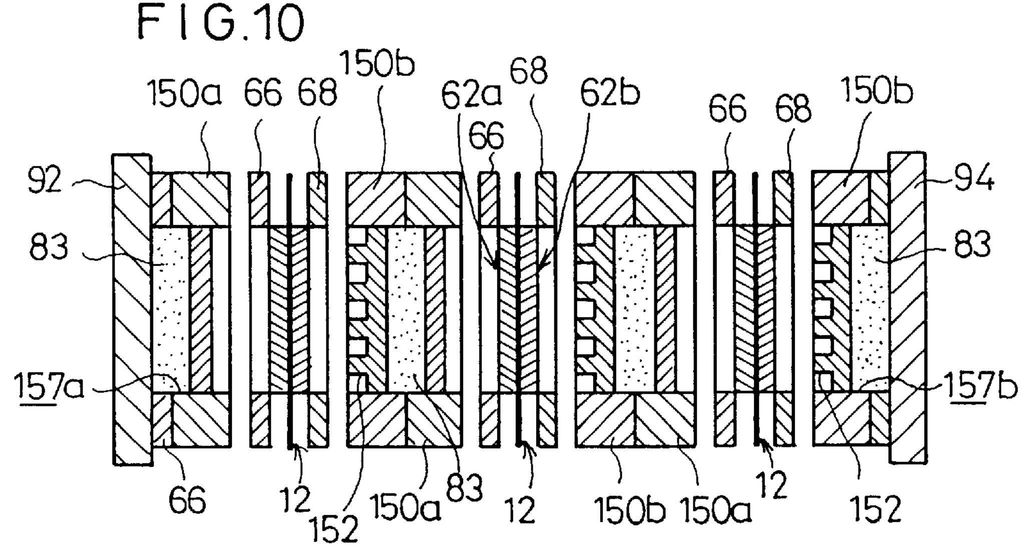
FIG. 10 shows a schematic illustration illustrating a combined state of the separators shown in FIG. 9, the fuel cell units, and the end plates.
Figure 11:
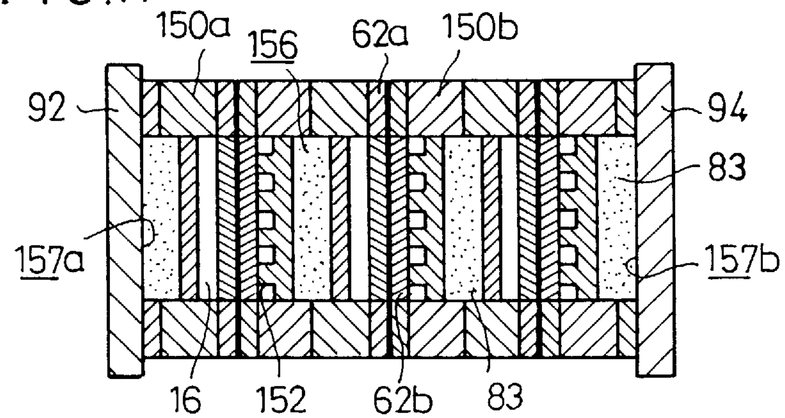
FIG. 11 shows a vertical cross-sectional view illustrating a state in which the fuel cell units shown in FIG. 10 are stacked.
Figure 12:
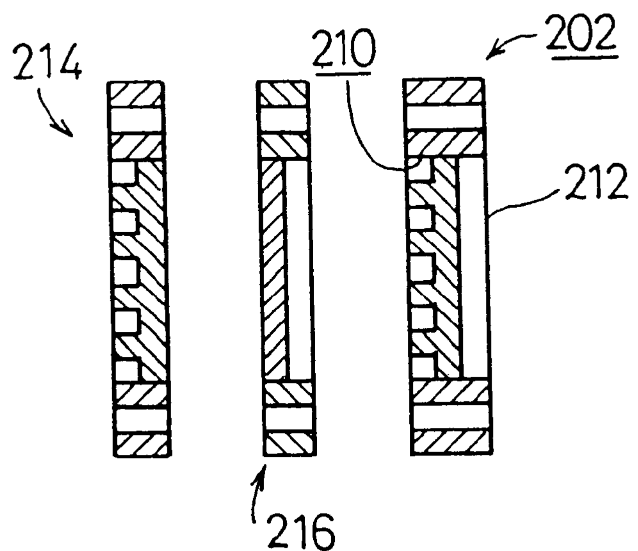
FIG. 12 shows a vertical cross-sectional view illustrating a state of arrangement of first, second, and fourth separators.
Figure 13:
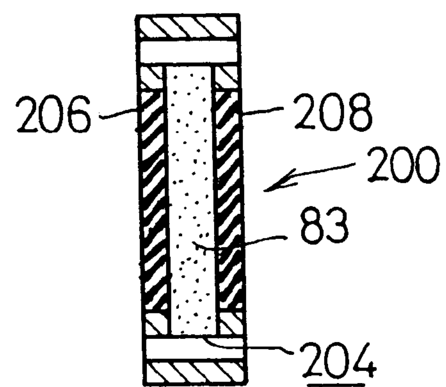
FIG. 13 shows a vertical cross-sectional view illustrating a fastening pressure-generating plate.

As shown in FIG. 10, the main cathode separator body 150*a* is installed to one end plate 92 via the gasket 66 to define a chamber 157*a* for charging the filler 83 between the end plate 92 and the main anode separator body 150*a*. The main cathode separator body 150*b* is allowed to face the gasket 68. The gasket 68 and the next gasket 66 are used to interpose the power-generating section 12 comprising the electrode catalyst layer 62*a*, the solid polymer oxide 60, and the electrode catalyst layer 62*b*. Therefore, the main cathode separator body 150*b* contacts with the electrode catalyst layer 62*a*. The electrode catalyst layer 62*b* contacts with the main anode separator body 150*b* (see FIG. 11). By adopting the arrangement as described above, the main anode separator body 150*a* is installed to the final end plate 94 via the gasket 68. The first separator 16, which is provided inside the main anode separator body 150*a*, abuts against the electrode catalyst layer 62*b*. A chamber 157*b* for charging the filler 83 is defined between the other end plate 94, the gasket 66, and the first separator 16.

The closed type fuel cell is arranged as described above, in which any one of the chambers 156, 157*a*, 157*b* does not communicate with the chamber of another unit fuel cell. The filler 83 is charged in the chambers 156, 157*a*, 157*b* of the closed type fuel cell. Unlike the embodiment described above, water or methanol or a mixed liquid of water and methanol is not introduced into the chambers 156, 157*a*, 157*b* via the communicating holes 50, 52. Namely, the filler 83, which makes expansion, contraction, or deformation in accordance with the external environmental temperature, the chemical treatment, or the heat, is selected and charged in the chambers 156, 157*a*, 157*b*. Accordingly, the filler 83 presses the main anode separator body 150*a* and/or the main cathode separator body 150*b*, making tight contact with the electrode catalyst layers 62*a*, 62*b* under the pressure. As a result, sufficient clamping force is given to the fuel cell 10.

Still another embodiment is shown in FIGS. 12 to 15. Especially, in this embodiment, a fastening pressure-generating plate 200 is adopted in place of the main separator body 150 described in the foregoing embodiment. Further, a fourth separator 202 is adopted.

The fastening force-generating plate 200 is extremely similar to the main separator body 150 described in the foregoing embodiment. However, in this embodiment, the fastening force-generating plate 200 is slightly different from the main separator body 150 in that a chamber 204 for charging the filler 83 is defined at a cross-sectional central portion thereof and plate 200 is independent of the separator bodies 214, 216 (described below). Thus, the fastening force-generating plate 200 does not require the plurality of small holes 38, 40 extending in the horizontal direction and the plurality of small holes 46, 48 extending in the vertical direction which are included in the main separator body 150. A cathode pressing plate 206 is fitted to one of large open holes disposed on both sides of the fastening pressure-generating plate 200, and an anode pressing plate 208 is fitted to the other open hole.

The fourth separator 202 has an opening 210 penetrating with a large dimension from one side surface to the other side surface, which is fitted with a separator plate 212 having a structure in which the first separator 16 described in the first embodiment and the third separator 152 described in the second embodiment are combined in an integrated manner. In the drawings, reference numeral 214 indicates the main separator body which is the same as the main anode separator body 150*a*, and reference numeral 216 indicates the main separator body which is the same as the main cathode separator body 150*b*, as described in the second embodiment.

Figure 14:
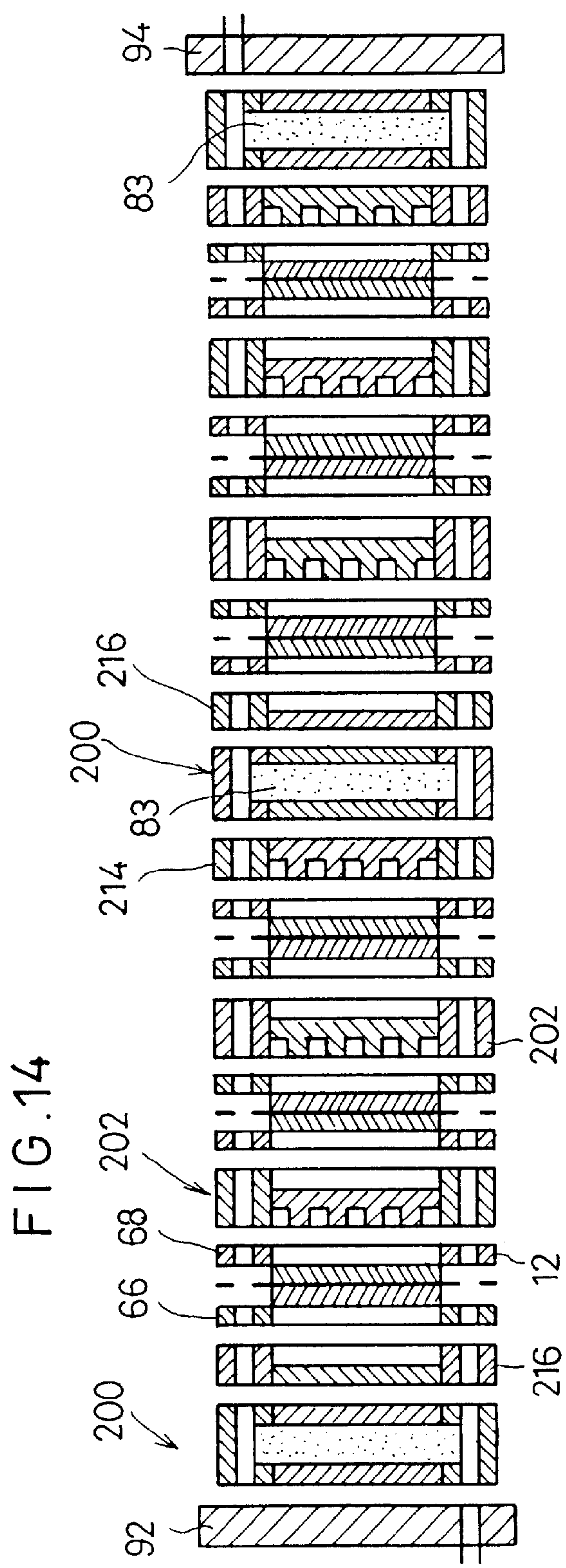
FIG. 14 shows an exploded vertical cross-sectional view illustrating combination of those shown in FIGS. 12 and 13 and the gaskets.
Figure 15:
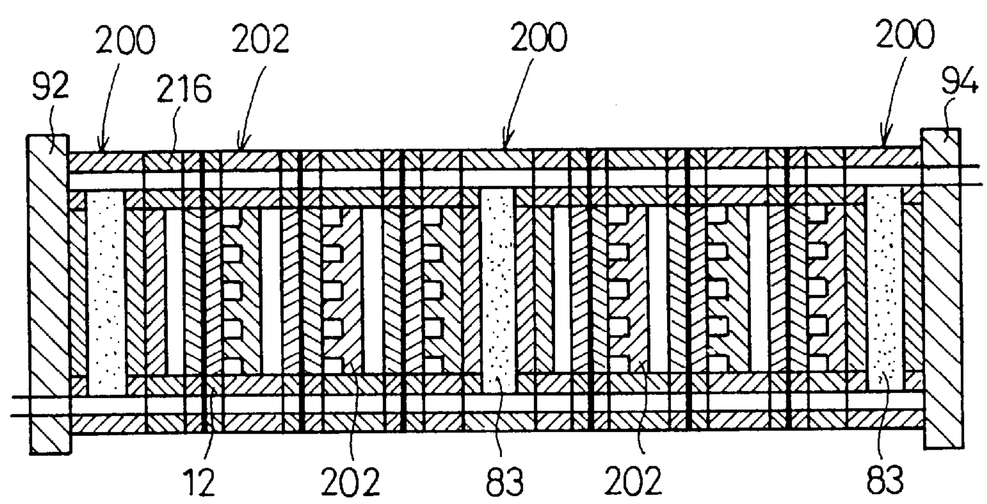
FIG. 15 shows a vertical cross-sectional view illustrating a state in which the respective constitutive elements shown in FIG. 14 are assembled.

The fastening pressure-generating plates 200, the fourth separators 202, and the main separator bodies 214, 126 are arranged between the end plates 92, 94 in an order as shown in FIG. 14. FIG. 15 shows a schematic vertical cross-sectional view of an assembly obtained by using the foregoing components. The fastening pressure-generating plate 200 engages and functions as an operating part of the adjacent main separator bodies 214, 216 that have movable separator plates which function in the same manner as the first separator 16 and the third separator 152, respectively, of the second embodiment shown in FIG. 8. The fastening pressure-generating plate 200 can be formed separately from or integrally with the separator plates of the main separator bodies 214, 216.

In the fuel cell constructed as described above, provision of the filler 83*a* to 83*g* in the chamber 25 or the chamber 204 will be explained below with reference to FIG. 16 and followings.

Figure 16:
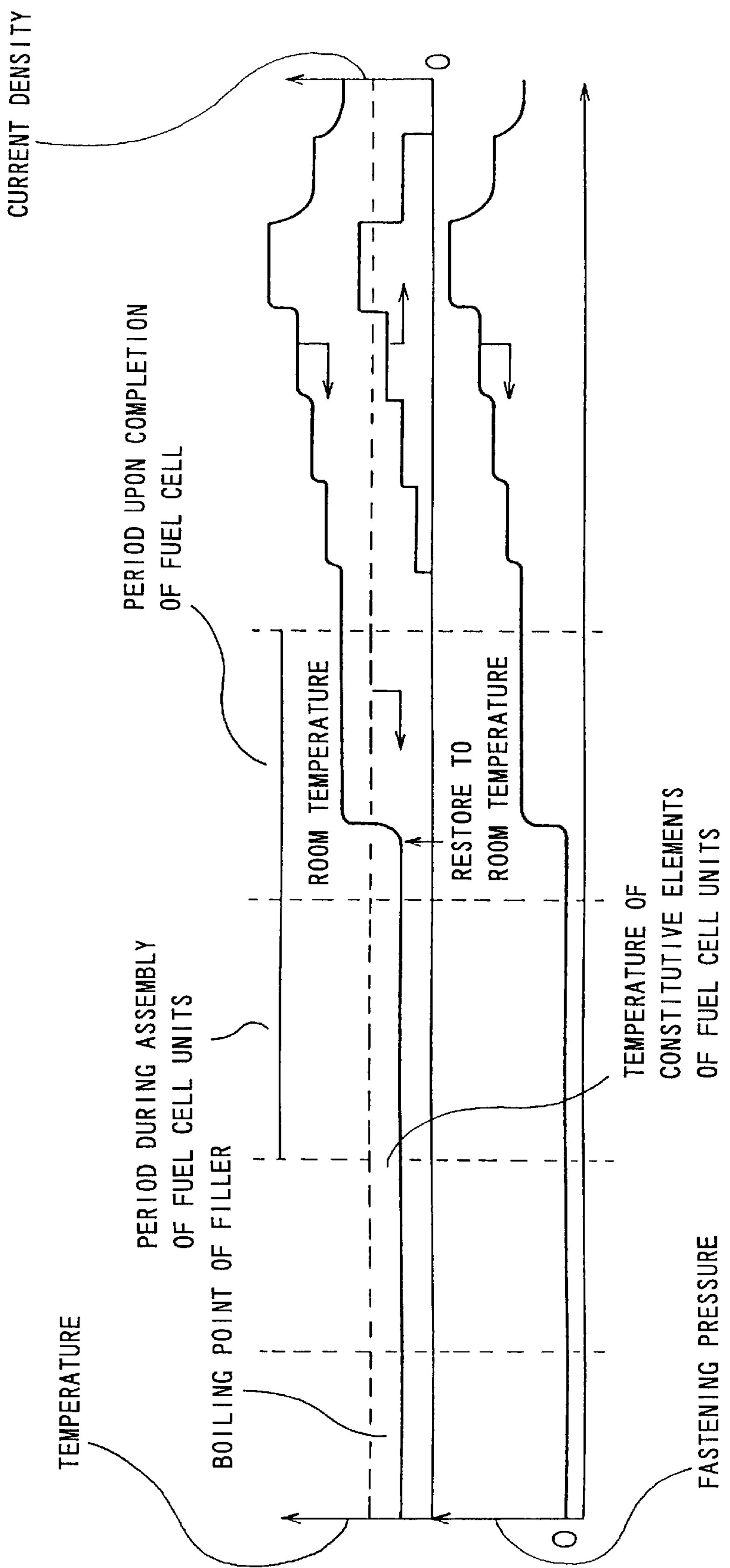
FIG. 16 shows characteristic curves illustrating the relationship of the temperature, the fastening pressure, and the current density.

(1) Case of Use of Filler 83*a* to Make Expansion or Contraction in Accordance With Absorption or Release of Heat (see FIG. 16)

The filler 83*a* is maintained at a temperature lower than the boiling point until the fuel cell is assembled. When the fuel cell is restored to the room temperature after completion of assembly, the filler 83*a* undergoes a temperature not less than the boiling point. Accordingly, the filler 83*a* makes expansion to increase the fastening pressure on the fuel cell and increase the current density of power generation.

Figure 17:
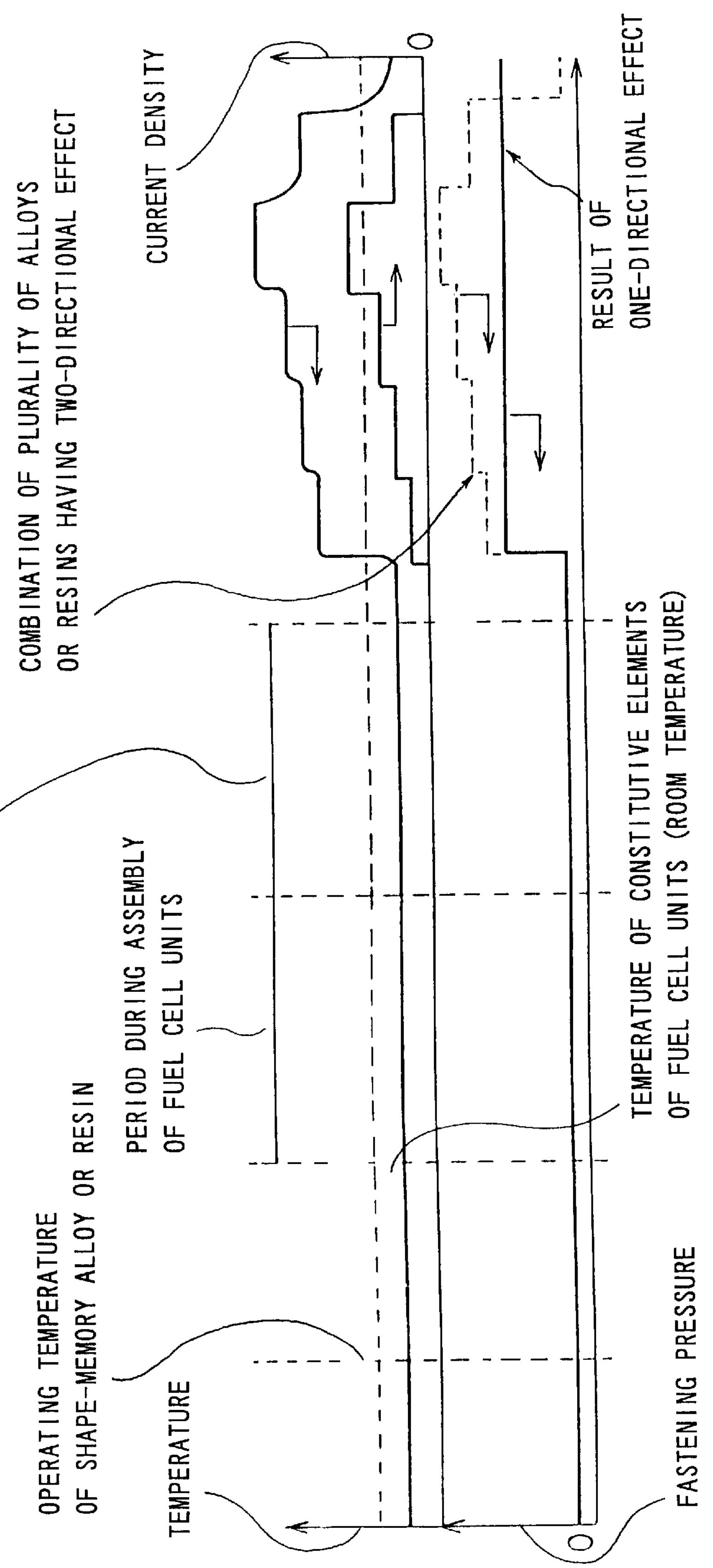
FIG. 17 shows characteristic curves illustrating the relationship of the temperature, the fastening pressure, and the current density, obtained when a shape-memory alloy is used as a filler.

(2) Case of Use of Filler 83*b* to Make Deformation in Accordance With Absorption or Release of Heat (see FIG. 17)

The temperature is maintained to be not higher than the operating temperature of the deformable filler 83*b* (the shape-memory alloy or the shape-memory resin) until completion of the fuel cell. When it is intended to operate the fuel cell upon and after completion of the fuel cell, the fuel cell is warmed to a temperature not lower than the operating temperature of the shape-memory alloy or the shape-memory resin. As a result, at the point of time of arrival at a temperature not lower than the operating temperature, the shape-memory alloy or the shape-memory resin is deformed to increase the fastening pressure exerted on the fuel cell units, and the current density is also increased. In this procedure, when a shape-memory alloy or a shape-memory resin having the two-directional effect is used, it is possible to adjust the fastening pressure more arbitrarily as compared with those based on the use of the one-directional effect. Such a situation is shown in FIG. 17 with broken lines. Namely, during the period of assembly of the fuel cell and upon completion of the fuel cell, the shape-memory alloy or the shape-memory resin is adjusted to have a spring coil-shaped or a random coil-shaped configuration so that the alloy or the resin may make full elongation at a temperature not lower than the operating temperature. When the temperature is raised to be not lower than the operating temperature, the shape-memory alloy or the shape-memory resin acts on the anode and cathode electrode catalyst layers, as if the alloy or the resin is forced and expanded.

Figure 18:
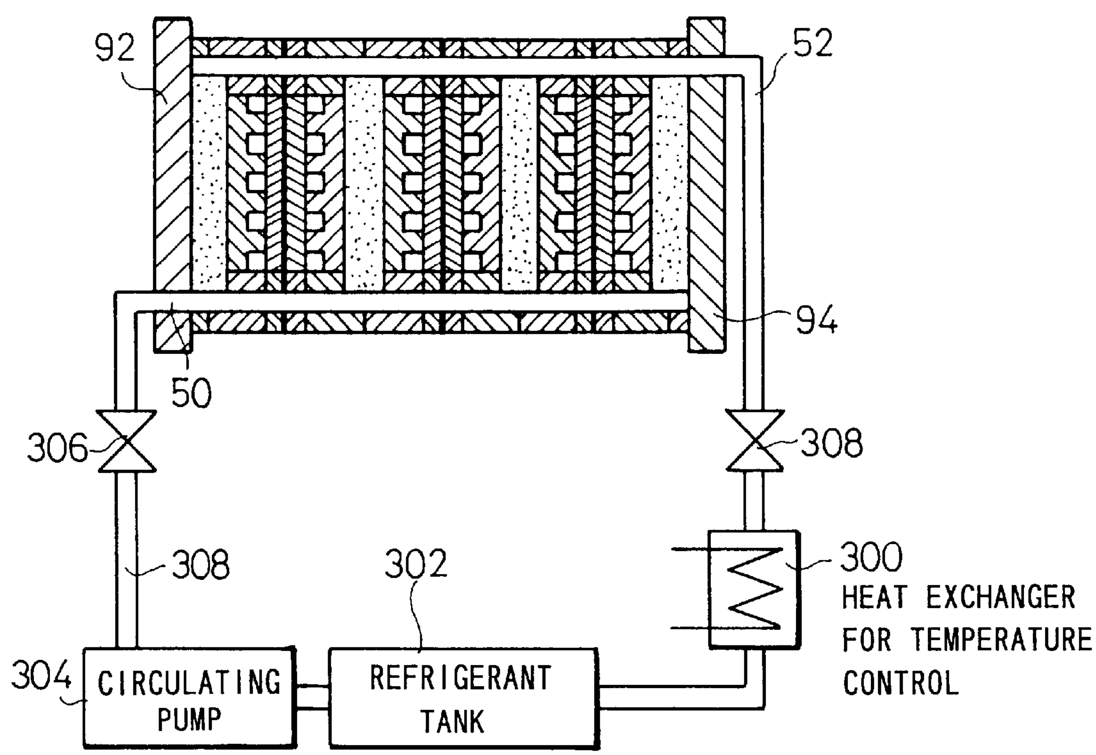
FIG. 18 shows a schematic arrangement in a state in which a refrigerant system is incorporated into the fuel cell according to the present invention.

On the other hand, as shown in FIG. 18, in order to improve the temperature control characteristic for power generation effected by the fuel cell, a heat exchanger for temperature control 300, a refrigerant tank 302, a circulating pump 304, and a valve 306 are allowed to make communication with each other by using a tube passage 308. The valve 306 is connected to the communicating hole 50 via the tube fitting 88 shown in FIG. 6. Thus a circulating system is constructed, in which the flow passes through the chamber 25, and it arrives at the heat exchanger for temperature control 300 again from the communicating hole 52 via the valve 308.

When the single substance of the shape-memory alloy or the shape-memory resin, which causes the one-directional effect, is charged, if the temperature of the fuel cell units exceeds the operating temperature of the shape-memory alloy or the shape-memory resin, then the filler 83 charged in the separator is elongated to generate the fastening pressure. In this case, even when the power generation effected by the fuel cell is stopped or completed, or when the temperature of the fuel cell returns to room temperature, a state is continued in which the fastening pressure is still retained.

On the other hand, when a plurality of shape-memory alloys or shape-memory resins having the two-directional effect are combined and used as the filler 83, if the temperature of the fuel cell exceeds the operating temperatures of the respective shape-memory alloys, then the shape-memory alloys or the shape-memory resins charged in the separator are successively elongated. Thus it is possible to increase the fastening pressure in a stepwise manner.

When the power generation effected by the fuel cell is stopped or completed, the fastening pressure is decreased in a stepwise manner because of the two-directional characteristic, during the process in which the temperature of the fuel cell returns to room temperature (see FIG. 19).

Figure 20:
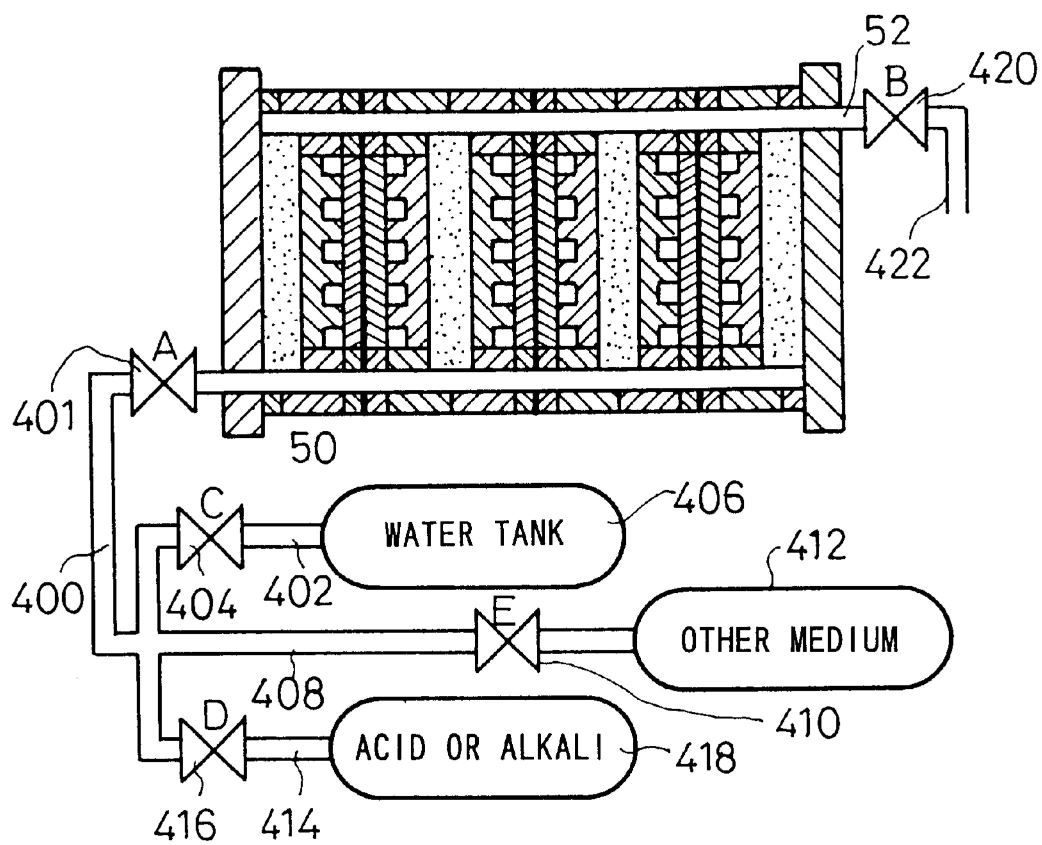
FIG. 20 shows a vertical cross-sectional view illustrating a schematic arrangement of a fuel cell for generating the fastening pressure by inducing a chemical reaction, and a system for forming chemically reactive substances.

(3) Case of Use of Filler 83*c* to Make Expansion or Contraction in Accordance With Chemical Reaction (see FIG. 20)

In this case, when the fuel cell unit is assembled, the ion exchange resin in a dry state is used as the filler 83*c*, and it is charged into the chamber 25 or the chamber 204 at room temperature. In such a state, the fuel cell units are assembled under the room temperature condition, and a tube passage 400 is connected to the communicating hole 50 via the tube fitting 88 as shown in FIG. 20. A valve 404 is inserted into a tube passage 402 which communicates with the tube passage 400. A water tank 406 is allowed to communicate with the tube passage 402. On the other hand, the tube passage 400 further communicates with a tube passage 408. A valve 410 is inserted into the tube passage 408, and a tank 412 for another medium is connected to the tube passage 408. Further, the tube passage 400 communicates with a tube passage 414. A valve 416 is inserted into the tube passage 414. A tank 418 for storing an acid or alkaline solution is connected to the tube passage 414. A tube passage 422, into which a valve 420 is inserted, communicates with the communicating hole 52.

Under the situation as described above, the valves 404, 410, 416 inserted into the tube passage 400 are opened. Thus water is supplied from the water tank 406 to the filler 83 in the dry state, and the ion exchange resin for constituting the first filler 83 is wetted to make expansion. As a result, the fastening pressure on the fuel cell units is generated.

Next, in order to expand another ion exchange resin which constitutes a part of the filler 83, the solution of acid or alkali stored in the tank 418 is supplied by opening the valve 416. During this process, it is a matter of course that the valve 404 is closed.

Subsequently, in order to remove ion liberated in the fuel cell units, washing is performed with pure water. It will be understood that the washing operation as described above is easily achieved by supplying pure water from the water tank 406.

In order to expand the ion exchange resin by wetting it by injecting liquid other than water, it is preferable that a medium in which the ion exchange resin is not dissolved is stored in the tank 412 for storing the other medium.

In the fuel cell constructed as described above, the fastening pressure is given as follows during power generation effected by the fuel cell. Namely, the fastening pressure is raised by expansion of the resin itself of the ion exchange resin, or by expansion of the resin in accordance with ion exchange. Further, the medium used for the chemical reaction is subjected to increase or decrease in vapor pressure effected by heat generation caused by the internal resistance of the cell in accordance with increase or decrease in fuel density during power generation performed by the fuel cell. Thus the fastening pressure appears in an added and combined manner. The fastening pressure can be easily controlled by cooling the medium used for the chemical reaction. When the power generation effected by the fuel cell is stopped or completed, and the temperature of the fuel cell itself returns to room temperature, then the fastening pressure caused by wetting of the ion exchange resin or the fastening pressure caused by wetting of the ion exchange resin and expansion of the resin brought about by change in ionic form is restored to the original state.

Figure 21:
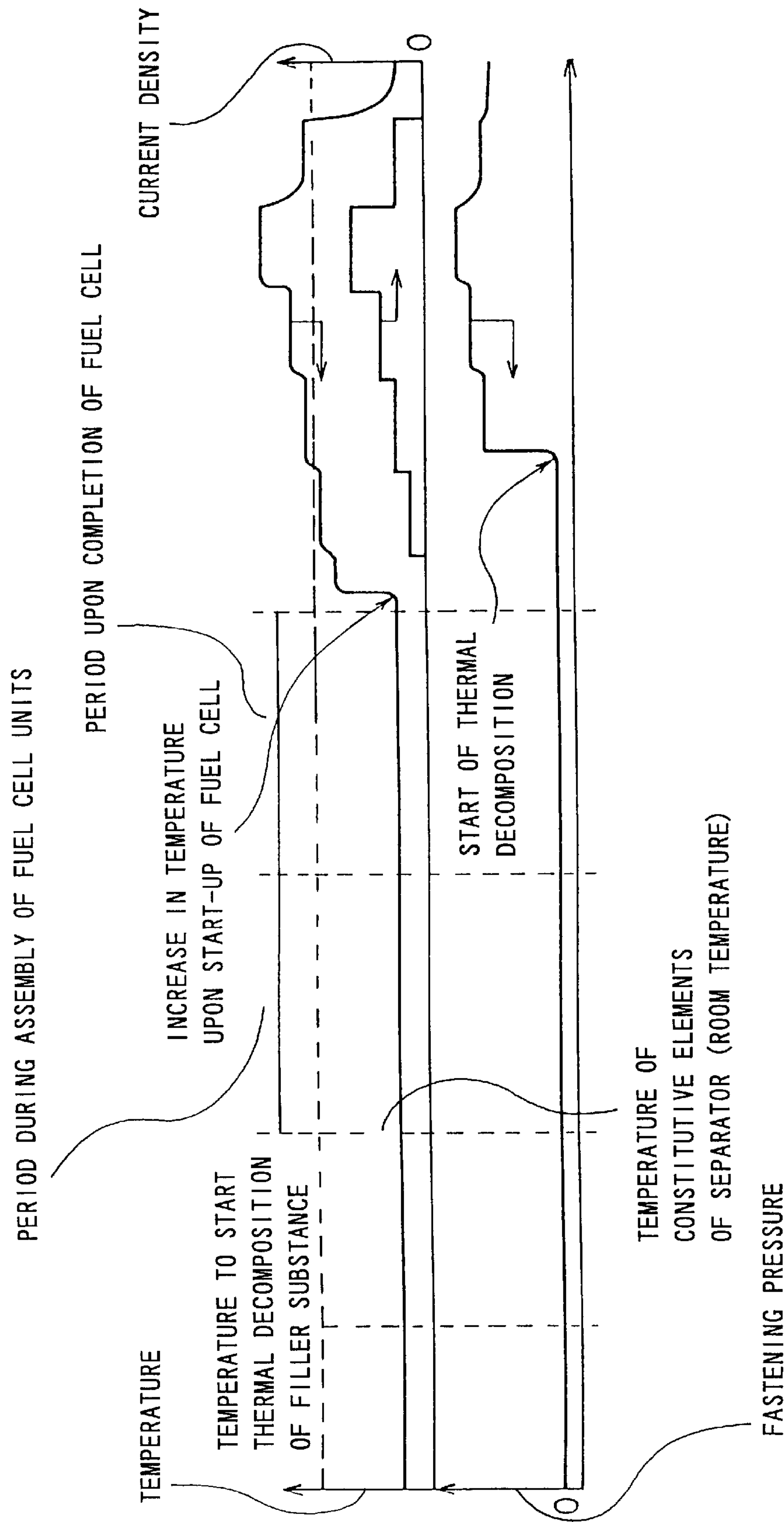
FIG. 21 shows a graph illustrating the relationship of the temperature, the fastening pressure, and the current density for generating the fastening pressure by thermally decomposing a filler substance.

(4) Case of Use of Filler 83*d* to Produce Gas in Accordance With Thermal Decomposition of Substance Itself or Chemical Reaction (see FIG. 21)

When the filler 83*d* of this type is used, it is preferable to use the fuel cell of the closed type. However, in some cases, it is also preferable to use the fuel cell of the type in which the communicating holes 50, 52 are completely closed after assembling the fuel cell units. When the filler 83*d* is used, the fuel cell units and the separators are assembled at room temperature, and the filler 83*d* is selected so that the temperature of thermal decomposition thereof exists in the region of operating temperature of the fuel cell. Therefore, when the power-generating action is effected by the fuel cell which is assembled at room temperature, the temperature of the separator or the fuel cell unit itself is raised. When the temperature exceeds the temperature of thermal decomposition of the filler 83*d*, then the volume is increased, and the pressure in the separator is increased to generate the fastening pressure. When the thermal decomposition is completed, the generated gas pressure is repeatedly increased or decreased depending on heat generation caused by the internal resistance of the cell associated with the phenomenon of increase in current density during power generation effected by the fuel cell. The change in pressure appears as change in fastening pressure. When the power generation effected by the fuel cell is stopped or completed, the temperature of the fuel cell units returns to room temperature. During this process, the pressure is decreased to arrive at the fastening pressure corresponding to the gas pressure which is lowered in accordance with the decrease in temperature.

Figure 22:
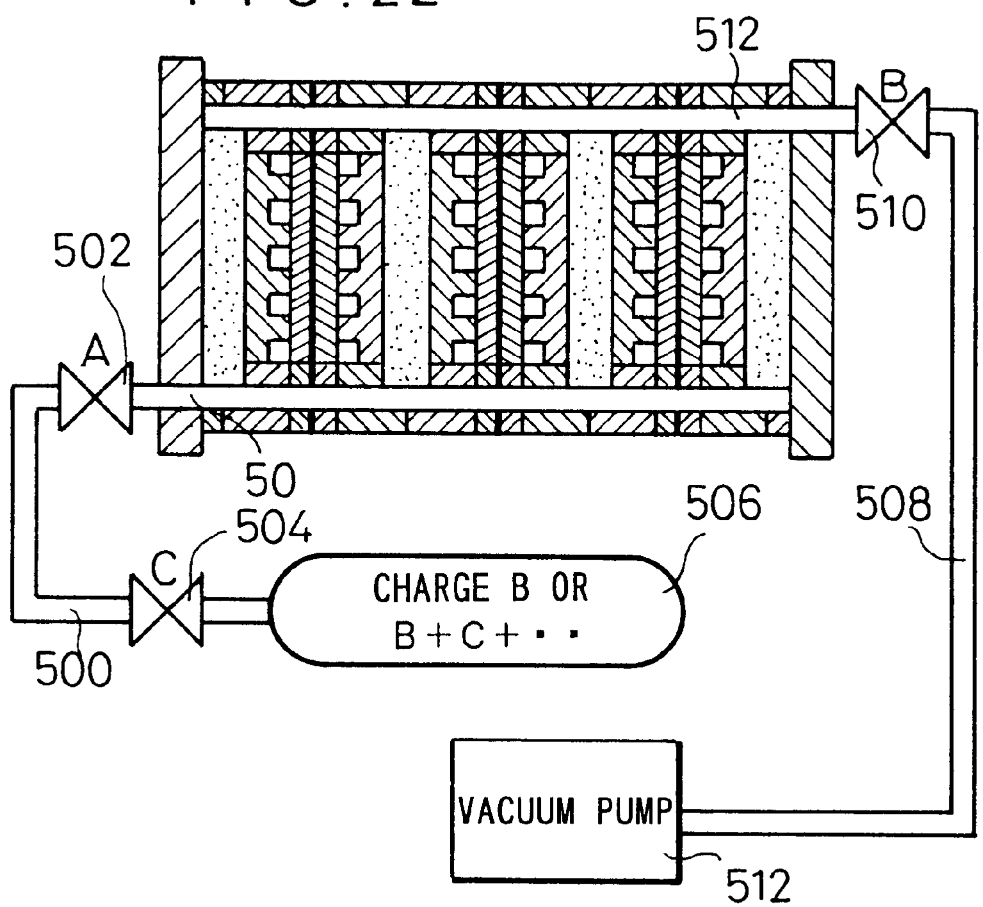
FIG. 22 shows a schematic vertical cross-sectional view of an arrangement of a fuel cell for incorporating a system for generating the fastening pressure by the aid of a chemical reaction.

(5) Case of Use of Filler 83*e* to Produce Gas in Accordance With Absorption or Release of Heat (see FIGS. 22 and 23)

During the period in which the fuel cell units are assembled, the chemically reactive substance is arranged as the filler 83*e* in the chamber 25 or the chamber 204. After the fuel cell units are assembled, a tube passage 500 is connected to the communicating hole 50. Valves 502, 504 are inserted into the tube passage 500. A tank 506 for storing a reactive agent B or reactive agents B+C . . . is connected to the side of the valve 504. On the other hand, a tube passage 508 is connected to the communicating hole 52 via a valve 510. A vacuum pump 512 is connected to the tube passage 508.

In the system constructed as described above, at first, the fuel cell units are assembled at room temperature. During this process, the filler 83*e* to induce the chemical reaction is charged into the chamber 25 or the chamber 204 beforehand. In this state, the vacuum pump 512 is operated to deaerate and remove the gas existing in the fuel cell units, for example, the inert gas for storing the fuel cell units (for example, nitrogen, argon, and helium) by using the vacuum pump 512. While maintaining a state of reduced pressure in the fuel cell units by using the vacuum pump 512, the reactive agent B or agents B+C . . . are fed from the tank 506 to the fuel cell units by operating and opening the valves 504, 502.

When the exothermic reaction is effected by the reaction caused by the filler 83*e* and the substance or substances supplied from the tank 506, the temperature is temporarily increased as shown in FIG. 23.

As described above, the gas pressure, which is produced by the chemical reaction caused by the filler 83*e* and the substance or substances supplied from the tank 506, stays at a gas pressure value corresponding to the equilibrium state of the reaction system irrelevant to the supply amount of the substance or substances from the tank 506 when the chemical reaction can achieve a reversible equilibrium state. Therefore, the fuel cell units are clamped at the gas pressure value.

On the other hand, when the chemical reaction with the filler 83*e* has no reversible equilibrium state, the gas is produced depending on the amount of charge of the substance or substances supplied from the tank 506. As a result, the internal pressure of the separator after completion of the fuel cell can be selected beforehand depending on the selected substance or substances. In the case of the fuel cell constructed as described above, when the power-generating action is effected by the fuel cell, the fastening pressure depends on the internal resistance which varies in accordance with increase or decrease in current density obtained from the fuel cell. Namely, the gas pressure is increased or decreased depending on the change in internal resistance.

When the power-generating action effected by the fuel cell is stopped or completed, and the temperature of the cell itself returns to room temperature, then the temperature of the gas in the separator also becomes room temperature. Accordingly, the fuel cell is restored to be in the state of fastening pressure upon the gas production caused by the chemical reaction.

(6) Case of Use of Filler 83*f* to Release or Absorb Gas in Accordance With Absorption or Release of Heat (see FIG. 23)

In this embodiment, the substance to be subjected to the chemical reaction is charged into the chamber 25 or 204 beforehand during assembly of the separator. After completion of assembly of the fuel cell units, the substance, which reacts with the previously charged substance, is supplied from the tank 506 as shown in FIG. 23. During this procedure, for example, the inert gas for storing the fuel cell units (for example, nitrogen, argon, and helium), which exists in the fuel cell units, is deaerated and removed by using the vacuum pump 512.

When the substance, which reacts with the previously charged substance, is supplied from the tank 506 while maintaining a pressure-reduced state in the fuel cell units, the chemical reaction is caused with the filler 83*e*. When the reaction is an exothermic reaction, the temperature is temporarily increased as shown in FIG. 23. The gas pressure, which is produced by the chemical reaction, stays at a value corresponding to the equilibrium state of the reaction system irrelevant to the supply amount of the substance from the tank 506 as described above when the chemical reaction can achieve a reversible equilibrium state.

On the other hand, when the chemical reaction has no reversible equilibrium state, the gas is produced depending on the amount of supply of the substance. Therefore, the internal pressure of the separator after completion of assembly of the fuel cell can be selected beforehand depending on the amount of supply of the substance.

The fastening pressure, which is obtained when power generation is effected by the fuel cell, can be recognized as change in heat generation amount brought about by internal resistance of the fuel cell units in accordance with increase or decrease in current density. For example, when the heat generation amount is large, the gas pressure is raised, while when the heat generation amount is small, the gas pressure is lowered.

When the power-generating action effected by the fuel cell is stopped or completed, the temperature of the fuel cull units is restored to room temperature. As a result, the temperature of gas in the separator is also restored to room temperature. Accordingly, the fuel cell returns to be in the state which has been originally obtained by the chemical reaction on the basis of the filler 83*e* and the substance supplied from the tank 506, i.e., the state of fastening pressure upon gas production.

Figure 24:
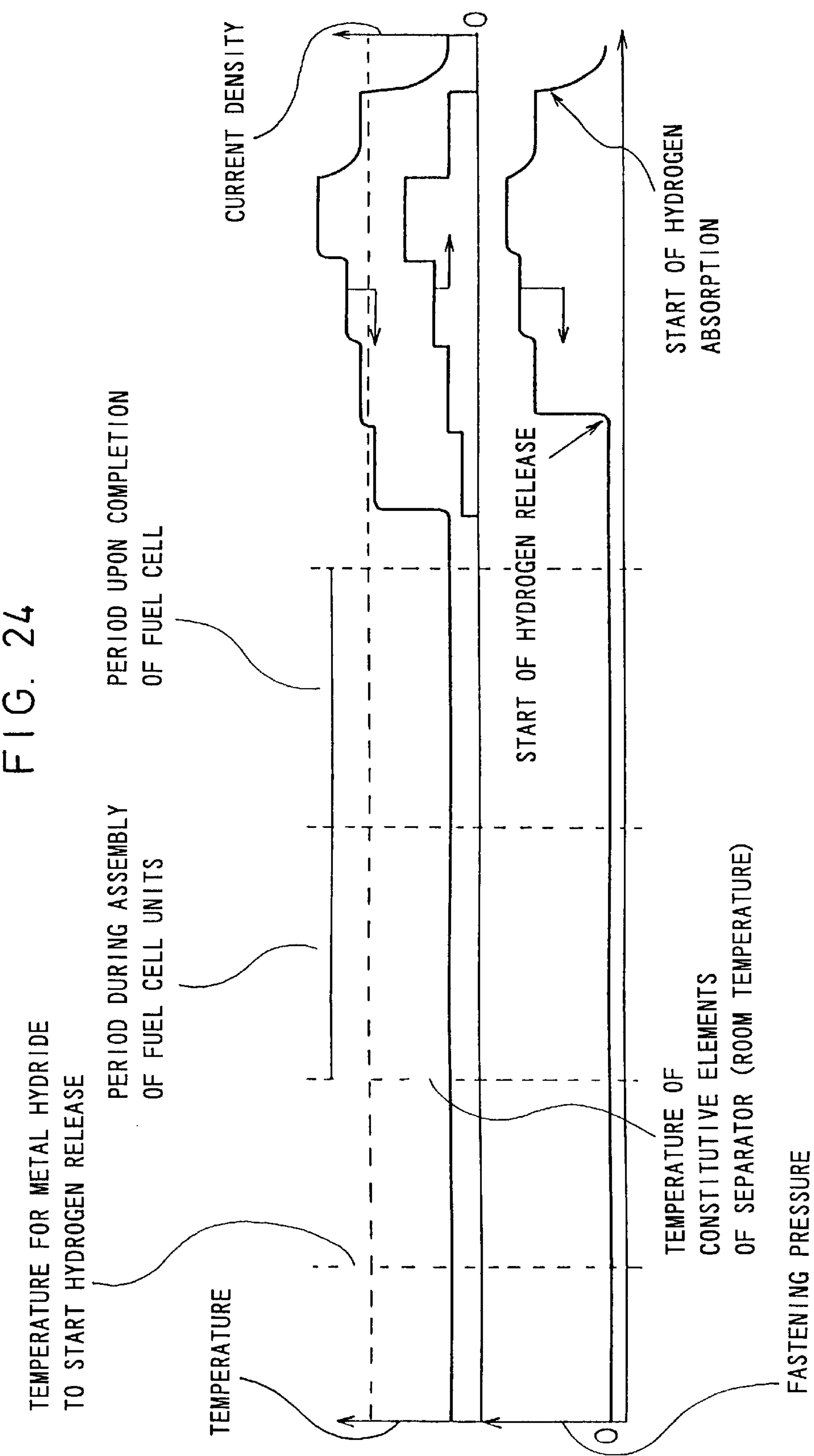
FIG. 24 shows a graph illustrating the relationship of the temperature, the fastening pressure, and the current density for generating the fastening pressure by utilizing the pressure of hydrogen released from metal hydride.

(7) Case of Use of Filler 83*g* to Make Displacement Depending on Heat (see FIG. 24)

In this embodiment, the separator is assembled at room temperature, and metal hydride is disposed in the chamber 25 or the chamber 204. The decomposition temperature of the metal hydride exists in the operating region of the fuel cell. Therefore, it is also preferable to consider combinations of a plurality of metal hydrides. However, in this embodiment, a single metal hydride is used.

During the process of assembly of the fuel cell, when the temperature exceeds the temperature for the metal hydride to release hydrogen, the filler 83*g* begins to release hydrogen gas. Accordingly, the pressure in the separator is increased, and thus the fastening pressure is generated. When the release of hydrogen gas is completed, the pressure based on the hydrogen gas is raised or lowered depending on heat generation caused by the internal resistance of the cell in accordance with increase or decrease in current density during power generation effected by the fuel cell. Therefore, the change in pressure appears as the fastening pressure of the fuel cell units brought about by the hydrogen gas.

When the power-generating action effected by the fuel cell is temporarily stopped or completed, the temperature of the cell is lowered during the process to return to room temperature, and the metal hydride begins to absorb released hydrogen. Therefore, the pressure of hydrogen gas is lowered, and the fastening pressure is also decreased. When the temperature of the fuel cell units returns to room temperature, the fastening pressure exhibits the same value as that obtained upon completion of assembly of the fuel cell units.

Further, according to the present invention, it is also possible to use the filler 83*h* which makes deformation depending on heat.

In this embodiment, at first, the fuel cell units are assembled at room temperature. In this procedure, the first separator 16 or the third separator 152 is constructed by using the shape-memory alloy itself. The shape-memory alloy is selected so that its operating temperature exists between the operating temperature of the fuel cell and room temperature. In this procedure, the shape-memory alloy may be any one of a shape-memory alloy which can change its shape in one direction and a shape-memory alloy which can change its shape in two directions.

In the system constructed as described above, the heat exchanger for temperature control, the refrigerant tank, and the circulating pump are connected to the communicating holes 50, 52 respectively in the same manner as depicted in FIG. 18 in order to improve the temperature control characteristic. In the case of use of the shape-memory alloy which causes the one-directional effect, when the operating temperature of the fuel cell exceeds the operating temperature of the shape-memory alloy, the first separator 16 and the third separator 152 make displacement to increase the fastening pressure. Even when the power-generating action effected by the fuel cell is stopped or completed, and the temperature of the cell returns to room temperature, then a state is continued in which the fastening pressure is still retained on account of the one-directional effect.

Figure 25:
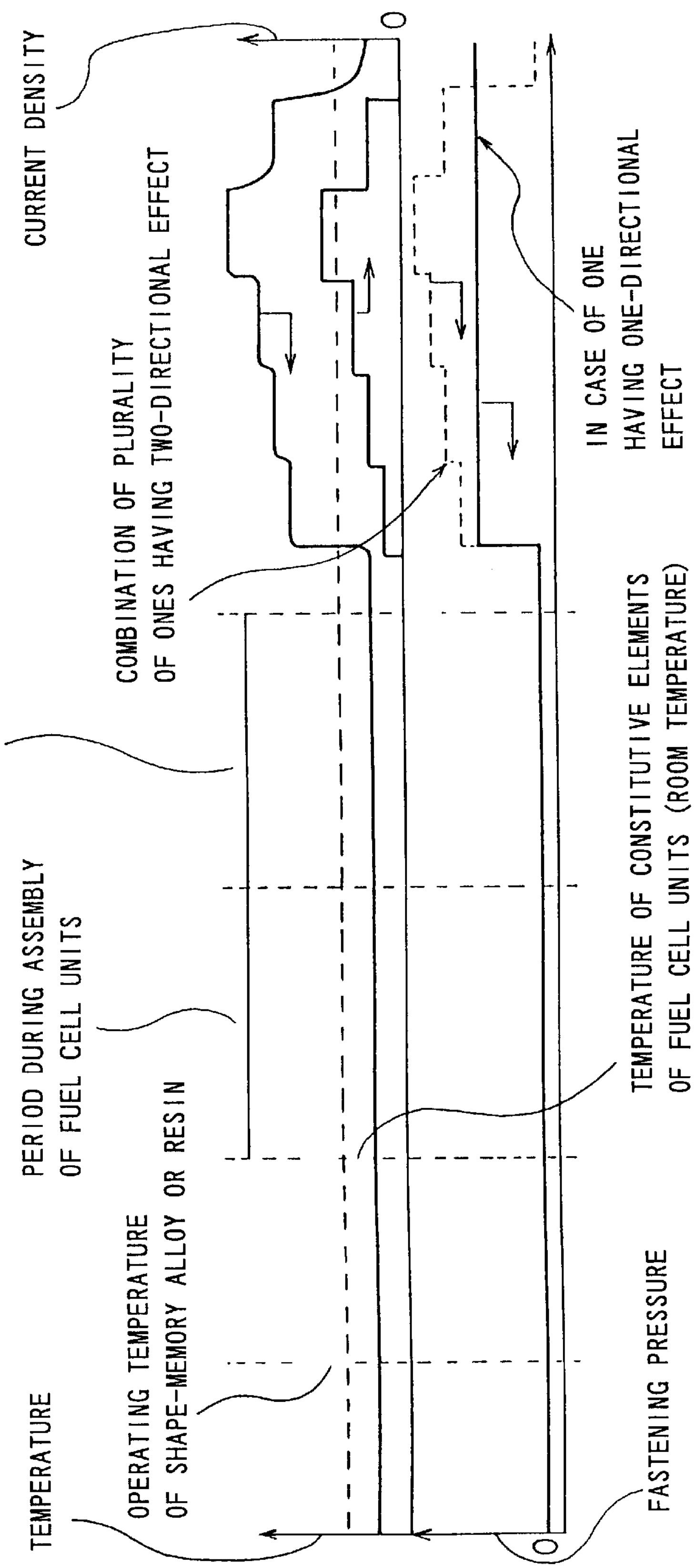
FIG. 25 shows a graph illustrating the relationship of the temperature, the fastening pressure, and the current density for generating the fastening pressure by deforming the member for constructing the fuel cell based on the use of a shape-memory alloy or a shape-memory resin.

On the other hand, in the case of combination of a plurality of shape-memory alloys based on the two-directional effect, when the fuel cell units undergo a predetermined temperature so that the operating temperatures of the respective shape-memory alloys are exceeded, then the respective shape-memory metals disposed in the fuel cell successively make deformation, and the fastening pressure is increased in a stepwise manner. During the process in which the power-generating action effected by the fuel cell is stopped or completed, or the temperature of the cell is restored, the fastening pressure is decreased in a stepwise manner on account of the two-directional effect (see FIG. 25).

INDUSTRIAL APPLICABILITY

According to the fuel cell and the fastening method therefor concerning the present invention, the following effects are obtained.

According to the present invention, the fuel cell is arranged, at the inside of the separator or the fastening pressure-generating plate, with the expandable or contractible filler, the substance to induce the chemical reaction, or the substance to make deformation by itself resulting from heat, whereby the fuel cell units are fastened after completion of assembly or during operation thereof. Therefore, the fastening pressure on the unit fuel cells is averaged, and the obtained output is substantially approximately the same. Namely, an effect is obtained in that there is no distribution in contact resistance or the like concerning ionic conductivity and electronic conductivity, making it possible to take out the output in a stable manner.

Further, the fastening pressure can be uniformly obtained by using the extremely simple structure. Therefore, it is possible to obtain an inherent effect that the fuel cell can be produced inexpensively.

What is claimed is:

1. A fuel cell comprising a plurality of stacked fuel cell units each including an anode electrode plate and a cathode electrode plate, a separator inserted at a predetermined position, a chamber defined at a side of said separator, and a filler provided in said chamber, said filler being expandable or contractible in accordance with absorption or release of heat, wherein said separator is displaced in at least one direction toward said anode electrode plate and said cathode electrode plate as a result of said absorption or release of heat effected by said filler, so that a fastening force exerted on said respective fuel cell units is increased or decreased.

2. The fuel cell according to claim 1, wherein said filler, which is expandable or contractible in accordance with absorption or release of heat, has a boiling point at a temperature not higher than an operating temperature of said fuel cell.

3. The fuel cell according to claim 2, wherein said filler is composed of a substance which is unreactive with constitutive elements of said fuel cell.

4. The fuel cell according to claim 3, wherein said filler is composed of an inorganic compound or an organic compound.

5. The fuel cell according to claim 4, wherein said inorganic compound or said organic compound comprises any one of the following compounds or an appropriate combination thereof:

inorganic compounds:

- water, ammonia, carbon dioxide (including dry ice), argon, nitrogen, hydrogen, helium, neon, radon, xenon, krypton, and oxygen;

organic compounds:

- alcohols: methanol, ethanol, and isopropanol;
- aldehydes/ketones: acetoaldehyde, acetone, ethyl methyl ketone, and formaldehyde;
- ethers: ethyl propyl ether, ethyl methyl ether, diethyl ether, dimethyl ether, and diisopropyl ether;
- saturated hydrocarbons: methane, ethane, propane, butane, pentane, isopentane, hexane, and isohexane;
- cyclic compounds: cyclobutane, cyclopropane, cyclohexane, cyclopentane, hexafluorobenzene, and perfluorocyclohexane;
- esters: methyl formate, ethyl formate, methyl acetate, ethyl acetate, and vinyl acetate.

6. A fuel cell comprising a plurality of stacked fuel cell units each including an anode electrode plate and a cathode electrode plate, a separator inserted at a predetermined position, a chamber defined at a side of said separator, and a filler provided in said chamber, said filler being deformable in accordance with absorption or release of heat, wherein said separator is displaced in at least one direction toward said anode electrode plate and said cathode electrode plate as a result of deformation of said filler, so that a fastening force exerted on said respective fuel cell units is increased or decreased.

7. The fuel cell according to claim 6, wherein said chamber communicates with a flow passage space for a cooling medium for cooling said fuel cell units, and said filler which is deformable in accordance with absorption or release of heat is also disposed in said flow passage space for said cooling medium.

8. The fuel cell according to claim 6 or 7, wherein said filler which is deformable in accordance with absorption or release of heat is a shape-memory alloy having a memory effect to make deformation in one direction or two directions.

9. The fuel cell according to claims 6 or 7, wherein said filler has a coil spring-shaped configuration or a coil-shaped configuration.

10. The fuel cell according to claim 6 or 7, wherein said filler is an alloy of nickel and titanium or an alloy of copper, zinc, and aluminum.

11. The fuel cell according to claim 6 or 7, wherein said filler which is deformable in accordance with absorption or release of heat is a shape-memory resin.

12. The fuel cell according to claim 11, wherein said resin is composed of any one of or a combination of polynorbornene resin, polymer alloy containing a major component of polyester, urethane elastomer, and trans-polyisoprene cross-linked resin.

13. A fuel cell comprising a plurality of stacked fuel cell units each including an anode electrode plate and a cathode electrode plate, a separator inserted at a predetermined position, a chamber defined at a side of said separator, and a filler provided in said chamber, said filler being expandable or contractible in accordance with chemical reaction, wherein said separator is displaced in at least one direction toward said anode electrode plate and said cathode electrode plate as a result of expansion or contraction of said filler, so that a fastening force exerted on said respective fuel cell units is increased or decreased.

14. The fuel cell according to claim 13, wherein said filler is composed of a cation exchange resin, an anion exchange resin, or a mixture of cation and anion exchange resins.

15. The fuel cell according to claim 14, wherein said cation exchange resin has any one of backbone structures selected from a styrene system, a methacrylic system, an acrylic system, a polytetraflouroethylene system, and a pyridine system, and any one of functional groups selected from a sulfonic acid group, a carboxylic acid group, an aminophosphoric acid group, a pyridine group, a dithiocarbamic acid group, an iminodiacetic acid group, and an aminocarboxylic acid group, and said anion exchange resin has any one of backbone structures selected from a styrene system, a methacrylic system, an acrylic system, a phenol system, and a polytetraflouroethylene system, and any one of functional groups selected from a quaternary ammonium base, a secondary amine group, a tertiary amine group, and a polyamine group.

16. The fuel cell according to claim 13, wherein said filler is a water-absorptive gel or a water-absorptive resin.

17. The fuel cell according to claim 16, wherein said filler is acrylic acid, vinyl alcohol copolymer, or sodium acrylate polymer.

18. The fuel cell according to claim 13, wherein said filler is a smectite clay mineral or polyamide or a mixture of a smectite clay mineral and polyamide.

19. The fuel cell according to claim 18, wherein said filler is impregnated with any one of an inorganic compound, an organic compound, and an aromatic compound.

20. The fuel cell according to claim 19, wherein said inorganic compound, said organic compound, or said aromatic compound comprises any one of the following compounds or an appropriate combination thereof:

inorganic compounds:

water, ammonia, carbon dioxide (including dry ice), argon, nitrogen, hydrogen, helium, neon, radon, xenon, krypton, and oxygen;

organic compounds:

alcohols: methanol, ethanol, and isopropanol;

aldehydes/ketones: acetoaldehyde, acetone, ethyl methyl ketone, and formaldehyde;

ethers: ethyl propyl ether, ethyl methyl ether, diethyl ether, dimethyl ether, and diisopropyl ether;

saturated hydrocarbons: methane, ethane, propane, butane, pentane, isopentane, hexane, and isohexane;

cyclic compounds: cyclobutane, cyclopropane, cyclohexane, cyclopentane, hexafluorobenzene, and perfluorocyclohexane;

esters: methyl formate, ethyl formate, methyl acetate, ethyl acetate, and vinyl acetate;

aromatic compound:

benzene and toluene.

21. A fuel cell comprising a plurality of stacked fuel cell units each including an anode electrode plate and a cathode electrode plate, a separator is inserted at a predetermined position, a chamber defined at a side of said separator, a first filler provided in said chamber, said first filler being expandable or contractible in accordance with absorption or release of heat, and a second filler provided in said chamber, said second filler being expandable or contractible in accordance with chemical reaction, wherein said separator is displaced in at least one direction toward said anode electrode plate and said cathode electrode plate as a result of said absorption or release of heat effected by said first filler and said chemical reaction effected by said second filler, so that a fastening force exerted on said respective fuel cell units is increased or decreased.

22. The fuel cell according to claim 21, wherein said first filler is a substance having a boiling point at a temperature not higher than an operating temperature of said fuel cell.

23. The fuel cell according to claim 22, wherein said first filler comprises any one of the following compounds or an appropriate combination thereof:

inorganic compounds:

water, ammonia, carbon dioxide (including dry ice), argon, nitrogen, hydrogen, helium, neon, radon, xenon, krypton, and oxygen;

organic compounds:

alcohols: methanol, ethanol, and isopropanol;

aldehydes/ketones: acetoaldehyde, acetone, ethyl methyl ketone, and formaldehyde;

ethers: ethyl propyl ether, ethyl methyl ether, diethyl ether, dimethyl ether, and diisopropyl ether;

saturated hydrocarbons: methane, ethane, propane, butane, pentane, isopentane, hexane, and isohexane;

cyclic compounds: cyclobutane, cyclopropane, cyclohexane, cyclopentane, hexafluorobenzene, and perfluorocyclohexane;

esters: methyl formate, ethyl formate, methyl acetate, ethyl acetate, and vinyl acetate.

24. The fuel cell according to any one of claims 21 to 23, wherein said second filler is any one of or a mixture of an arbitrary combination of an ion exchange resin, a water-absorptive gel, a water-absorptive resin, a smectite clay mineral, and polyamide.

25. The fuel cell according to claim 24, wherein:

said ion exchange resin for constructing said second filler is any one of a cation exchange resin and an anion exchange resin;

said cation exchange resin has any one of backbone structures selected from a styrene system, a methacrylic system, an acrylic system, a polytetraflouroethylene system, and a pyridine system, and any one of functional groups selected from a sulfonic acid group, a carboxylic acid group, an aminophosphoric acid group, a pyridine group, a dithiocarbamic acid group, an iminodiacetic acid group, and an aminocarboxylic acid group and said anion exchange resin has any one of backbone structures selected from a styrene system, a methacrylic system, an acrylic system, a phenol system, and a polytetraflouroethylene system, and any one of functional groups selected from a quaternary ammonium base, a secondary amine group, a tertiary amine group, and a polyamine group.

26. A fuel cell comprising a plurality of stacked fuel cell units each including an anode electrode plate and a cathode electrode plate, a separator inserted at a predetermined position, a chamber defined at a side of said separator, and at least one of a first filler and a second filler provided in said chamber, said first filler being capable of causing thermal decomposition in accordance with absorption or release of heat, said second filler being capable of producing gas in accordance with chemical reaction, wherein a volume of said chamber is expanded by said thermal decomposition or said production of gas, and said separator is displaced in at least one direction toward said anode electrode plate and said cathode electrode plate, so that a fastening force exerted on said respective fuel cell units is increased or decreased.

27. The fuel cell according to claim 24, wherein said volume of said chamber is changed in accordance with said thermal decomposition depending on an operating temperature of said fuel cell based on a physical property of said first filler itself.

28. The fuel cell according to claim 26, wherein said second filler produces a gas having a boiling point at a temperature lower than an operating temperature of said fuel cell.

29. The fuel cell according to any one of claims 26 to 28, wherein said first and second fillers are any one of or an arbitrary combination of metal, metal oxide, metal hydride, metal carbide, metal nitride, metal chloride, carbonate, ammonium salt, nitrite, amide, weakly acidic salt, acid, alkali, oxidizing agent, and water.

30. The fuel cell according to any one of claims 26 to 28, wherein said produced gas is hydrogen gas, and said hydrogen gas is produced form any one of sets or an arbitrary combination of sets or metal and acid, metal and base, metal and water, metal and alcohol, and metal hydride and water.

31. The fuel cell according to claim 30, wherein said sets of metal and acid, metal and base, metal and water, metal and alcohol, and metal hydride and water comprise the following compounds:

metal and acid: zinc or transition metal and hydrochloric acid, and alkaline earth metal and acid;

metal and base: aluminum or silicon and sodium hydroxide, and alkaline metal and ammonia;

metal and water: alkaline metal or alkaline earth metal and water;

metal and alcohol: alkaline metal or alkaline earth metal and alcohol;

metal hydride and water: lithium hydride or hydride of alkaline earth metal and water, and sodium boron hydride or sodium aluminum hydride and water.

32. The fuel cell according to claim 29, wherein said produced gas is nitrogen gas, and said nitrogen gas is obtained from a combination of substances or a simple substance to produce said nitrogen gas, or thermal decomposition of ammonium nitrite.

33. The fuel cell according to claim 29, wherein:

said produced gas is carbon dioxide gas;

said carbon dioxide gas is obtained from any one of a combination of substances or a simple substance to produce said carbon dioxide gas, carbonate and acid, thermal decomposition of sodium hydrogen carbonate, thermal decomposition of carbonate, and carbonate and metal oxide;

said carbonate and acid are calcium carbonate and hydrochloric acid;

said thermal decomposition of carbonate is thermal decomposition of magnesium carbonate; and said carbonate and metal oxide reside in an eutectic reaction of silicon oxide and sodium carbonate.

34. The fuel cell according to claim 29, wherein:

said produced gas is ammonia gas;

said ammonia gas is obtained from any one of a combination of substances or a simple substance to produce said ammonia gas, ammonium salt and base, metal nitride and water, amide and water, and thermal decomposition of ammonium salt;

said ammonium salt and base are ammonium chloride and calcium hydroxide;

said metal nitride and water are magnesium nitride or calcium nitride and water;

said amide and water are sodium amide and water; and said thermal decomposition of ammonium salt is thermal decomposition of ammonium carbonate.

35. The fuel cell according to claim 29, wherein:

said produced gas is oxygen gas;

said oxygen gas is obtained from any one of a combination of substances or a simple substance to produce said oxygen gas, metal oxide and oxidizing agent, salt and oxidizing agent, decomposition of oxidizing agent, decomposition of metal oxide, and decomposition of salt;

said metal oxide and oxidizing agent are any one of silver oxide or lead oxide and hydrogen peroxide, lead oxide and sulfuric acid, potassium permanganate and hydrogen peroxide, potassium permanganate, hydrogen peroxide, and sulfuric acid, and manganese dioxide, hydrogen peroxide, and sulfuric acid;

said salt and oxidizing agent are bleaching powder and hydrogen peroxide;

said decomposition of oxidizing agent is decomposition of hydrogen peroxide;

said decomposition of metal oxide is thermal decomposition of copper oxide or silver oxide; and said decomposition of salt is thermal decomposition of potassium chlorate.

36. The fuel cell according to claim 29, wherein when any one of or both of said first and second fillers are water, said substance to product water is a combination of the following substances or a simple substance:

normal boric acid in the case of decomposition of acid;

phosphonic acid in the case of decomposition of salt;

evaporation of crystallization water in the case of salt involving crystallization water;

neutralization reaction with acid or base in the case of chemical reaction between a plurality of substances to produce water; and silicon dioxide and sodium hydroxide in the case of oxide and salt.

37. The fuel cell according to claim 28, wherein said second filler is subjected to temperature control in the following temperature region to release hydrogen gas effected by metal hydride used for said fuel cell:

solid polymer oxide fuel cell: not more than about 120° C.;

direct methanol/air fuel cell: not more than about 100° C.;

alkali electrolyte fuel cell: not more than about 100° C.;

phosphonic acid fuel cell: not more than about 200° C.;

molten carbonate fuel cell: not more than about 650° C.; and solid oxide fuel cell: not more than about 1000° C.

38. A fuel cell comprising a plurality of stacked fuel cell units each including an anode electrode plate and a cathode electrode plate, a separator inserted at a predetermined position, and a chamber defined at a side of said separator, wherein said separator is displaceable and at least a part of said separator is displaced in at least one direction toward said anode electrode plate and said cathode electrode plate as a result of heat, so that a fastening force exerted on said respective fuel cell units is increased or decreased by the separator displacement.

39. The fuel cell according to claim 38, wherein said part of said separator or said fastening force-generating plate is a shape-memory alloy, which is subjected to temperature control in the following operating temperature region of said shape-memory alloy used for said fuel cell;

solid polymer oxide fuel cell; not more than about 120° C.;

direct methanol/air fuel cell; not more than about 100° C.;

alkali electrolyte fuel cell; not more than about 100° C.;

phosphonic acid fuel cell; not more than about 200° C.;

molten carbonate fuel cell; not more than about 650° C.; and solid oxide fuel cell; not more than about 1000° C.

40. The fuel cell according to claim 8, wherein said filler has a coil spring-shaped configuration or a coil-shaped configuration.

41. The fuel cell according to claim 8, wherein said filler is an alloy of nickel and titanium or an alloy of copper, zinc, and aluminum.

42. The fuel cell according to claim 9, wherein said filler is an alloy of nickel and titanium or an alloy of copper, zinc, and aluminum.

43. The fuel cell according to claim 27, wherein said second filler produces a gas having a boiling point at a temperature lower than an operating temperature of said fuel cell.

44. The fuel cell according to claim 43, wherein said first and second fillers are any one of or an arbitrary combination of metal, metal oxide, metal hydride, metal carbide, metal nitride, metal chloride, carbonate, ammonium salt, nitrite, amide, weakly acidic salt, acid, alkali, oxidizing agent, and water.

45. The fuel cell according to claim 43 or 44, wherein said produced gas is hydrogen gas, and said hydrogen gas is produced from any one of sets or an arbitrary combination of sets of metal and acid, metal and base, metal and water, metal and alcohol, and metal hydride and water.

46. The fuel cell according to claim 45, wherein said sets of metal and acid, metal and base, metal and water, metal and alcohol, and metal hydride and water comprise the following compounds:

metal and acid: zinc or transition metal and hydrochloric acid, and alkaline earth metal and acid;

metal and base: aluminum or silicon and sodium hydroxide, and alkaline metal and ammonia;

metal and water: alkaline metal or alkaline earth metal and water;

metal and alcohol: alkaline metal or alkaline earth metal and alcohol;

metal hydride and water: lithium hydride or hydride of alkaline earth metal and water, and sodium boron hydride or sodium aluminum hydride and water.

* * * * *